(12) United States Patent
Gardill

(10) Patent No.: US 11,940,672 B2
(45) Date of Patent: Mar. 26, 2024

(54) ATTACHMENT FOR STRAIGHTENING EYEGLASSES AND FOR HOLDING DEVICES OR FASHIONWEAR

(71) Applicant: Michele Rose Gardill, Satellite Beach, FL (US)

(72) Inventor: Michele Rose Gardill, Satellite Beach, FL (US)

( * ) Notice: Subject to any disclaimer, the term of this patent is extended or adjusted under 35 U.S.C. 154(b) by 521 days.

(21) Appl. No.: 17/154,748

(22) Filed: Jan. 21, 2021

(65) Prior Publication Data
US 2021/0141242 A1 May 13, 2021

Related U.S. Application Data

(63) Continuation of application No. 16/268,233, filed on Feb. 5, 2019, now Pat. No. 10,955,686.

(60) Provisional application No. 62/710,058, filed on Feb. 7, 2018.

(51) Int. Cl.
| | |
|---|---|
| G02C 5/14 | (2006.01) |
| G02C 5/20 | (2006.01) |
| G02C 11/00 | (2006.01) |

(52) U.S. Cl.
CPC .............. *G02C 5/20* (2013.01); *G02C 11/00* (2013.01); *G02C 5/143* (2013.01)

(58) Field of Classification Search
CPC . G02C 5/14; G02C 5/143; G02C 5/16; G02C 11/02; G02C 11/04; G02C 11/10
See application file for complete search history.

(56) References Cited

U.S. PATENT DOCUMENTS

| | | | |
|---|---|---|---|
| 4,848,861 A | 7/1989 | McCulley | |
| 5,137,342 A | 8/1992 | Jannard | |
| 5,943,703 A * | 8/1999 | Avila, Jr. ................ | A61F 11/14 351/122 |
| 6,120,146 A * | 9/2000 | Harris ..................... | G02C 11/00 351/158 |

(Continued)

FOREIGN PATENT DOCUMENTS

| | | |
|---|---|---|
| JP | WO1995020179 A1 | 7/1995 |
| WO | WO-9520179 A1 * | 7/1995 ............. G02C 11/00 |

OTHER PUBLICATIONS

WO 9520179 A1 English translation (Year: 1995).*
(Continued)

*Primary Examiner* — Charlie Y Peng

(57) ABSTRACT

A one-piece eyeglass temple arm attachment that provides for straightening (i.e., leveling) of eyeglasses relative to a wearer's eyes. The invention relates to straightening eyeglasses relative to the eyeglass wearer's eyes necessitated by asymmetries of the wearer's ears relative to their eyes, or by other weight or height imbalances that create eyeglass crookedness relative to the wearer's eyes. The invention also provides the means for holding and/or shielding small devices or fashionwear. The invention is adjustable by the wearer, requires no tools, will not damage eyeglass frames (e.g., no heat or bending required), and is easily attached to or removed from an eyeglass temple arm. The invention can be manufactured from biocompatible polymers, and is washable, comfortable, and waterproof. The invention can be attached anywhere along an eyeglass temple arm in both conspicuous and inconspicuous locations.

21 Claims, 17 Drawing Sheets

(56) References Cited

U.S. PATENT DOCUMENTS

| | | | |
|---|---|---|---|
| 6,318,858 B1 * | 11/2001 | Siani | G02C 5/20 |
| | | | 351/111 |
| 8,549,879 B2 | 10/2013 | Mellinger | |
| 8,733,926 B2 | 5/2014 | Stewart | |
| 9,632,328 B2 | 4/2017 | Kavana | |
| 10,088,694 B1 * | 10/2018 | Casperson | D06F 95/008 |
| 2016/0077357 A1 | 3/2016 | Miller | |
| 2016/0338429 A1 * | 11/2016 | Mendez | G02C 11/12 |
| 2018/0292674 A1 | 10/2018 | Bond | |
| 2018/0356648 A1 | 12/2018 | Sugarek | |

OTHER PUBLICATIONS

Amazon.com, YR Company, "YR Soft Silicone Eyeglasses Temple Tips Sleeve Retainer,Anti-Slip Elastic Comfort Glasses Retainers for Spectacle Sunglasses Reading Glasses," Feb. 2, 2019: https://www.amazon.com/YR-Eyeglasses-Anti-Slip-Retainers-Sunglasses/dp/B074V7BPNL/ref=sr_1_fkmr0_2?ie=UTF8&qid=1549161262&sr=8-2-fkmr0&keywords=yr%2Bcompany%2Beyeglass&th=1.

* cited by examiner

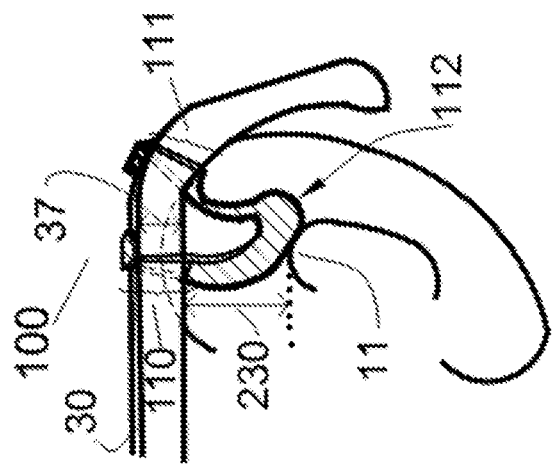
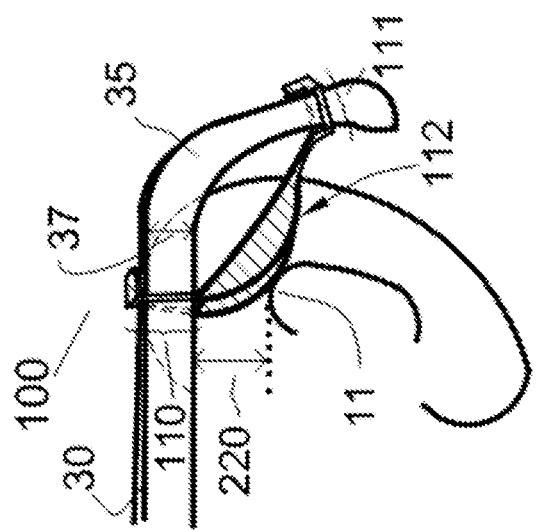
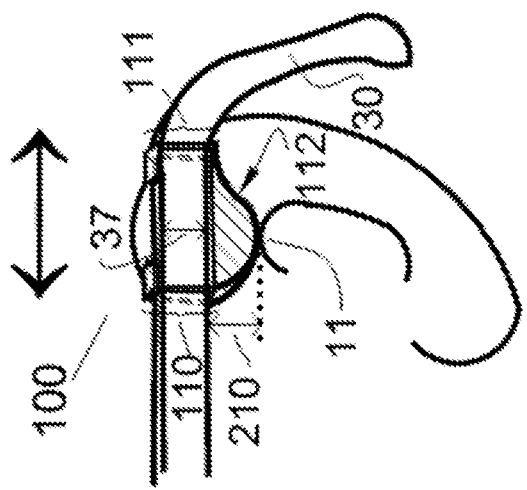

ATTACHMENT FOR STRAIGHTENING EYEGLASSES AND FOR HOLDING DEVICES OR FASHIONWEAR

CROSS-REFERENCE TO RELATED APPLICATIONS

This non-provisional patent application claims the benefit of provisional patent application 62/710,058, having a filing or 371(c) date of Feb. 7, 2018.

BACKGROUND OF THE INVENTION

Field of the Invention

The field of this invention relates generally to an attachment for prescription or nonprescription eyeglasses, reading glasses, driving glasses, surgical loupe glasses, safety glasses, smart eyeglasses or sunglasses (collectively, "eyeglasses" or "glasses"). More specifically, the field of this invention relates to an eyeglass temple arm attachment that provides a smoothly variable asymmetric height adjustment for straightening eyeglasses so that the eyeglasses are level relative to a person's eyes. Asymmetric height adjustment refers to the extension of the intrinsic eyeglass temple arm thickness on one of the eyeglass temple arms, and smoothly variable refers to height adjustment that is not required to be in pre-determined or distinct steps. The field of this invention also relates to an attachment which provides the means for holding and/or shielding small devices or fashionwear on the eyeglass temple arm.

By some estimates, over half of the population has asymmetric (i.e., uneven) ears relative to their eyes. The medical term for uneven ears is auricular dystopia. This condition can be explained in geometric terms as: the plane of a person's eyes is not parallel to the plane of the person's ears. This asymmetry can cause a pair of eyeglasses to appear crooked on the wearer's face relative to their eyes.

According to a large, established U.S. council on vision, over 64% of U.S. adults wear eyeglasses for vision correction (from "US Optical Overview and Outlook, December 2015" by The Vision Council, at https://www.thevisioncouncil.org/sites/default/files/Q415-Topline-Overview-Presentation-Stats-with-Notes-FINAL.PDF.) Additionally, many other people wear eyeglasses for non-corrective reasons (e.g., sunglasses, driving glasses.)

Since both the occurrence of uneven ears and the wearing of eyeglasses are very common, the combination of these two conditions (people with uneven ears who also wear eyeglasses) is also very common. The very common condition of uneven ears makes eyeglasses—which are generally manufactured only for perfectly even ears—crooked on the face of the wearer, since eyeglass temple arms rest on the ears.

Aside from auricular dystopia, other weight or height imbalances can cause eyeglass crookedness relative to the wearer's eyes. Weight imbalance may also be caused by prescription differences between the right lens and the left lens. The usage of "smart eyeglasses" and associated devices or components attached thereto, for example, and other devices or fashionwear attached to eyeglasses can also create a weight imbalance causing eyeglasses to be crooked on the user's face. Devices worn on one side of the eyeglasses that may cause a weight imbalance include, but are not limited to, audio/visual electronic components, "smart eyeglasses" devices or components, personal identification component(s), recording devices, lights, loupes, visual aids, hearing aids, and global positioning or tracking component(s.) These types of devices are becoming more and more common as technology advances. All these scenarios would benefit from a means for asymmetrically straightening eyeglasses.

Crooked eyeglasses may also be caused by a device placed over or under an eyeglass temple arm, but not attached to an eyeglass temple arm. These unattached devices include, but are not limited to, hearing aids and audio devices.

Importantly, if eyeglasses are crooked on the wearer's face, then the eyeglass lenses are not level with the wearer's eyes and are likely not providing the eyeglass fit that the eyeglass professional originally intended. This is because the intended fit is typically based on eyeglasses which fit straight relative to the wearers' eyes (i.e., plane of the eyeglasses are parallel to the plane of the eyes.)

These are a few reasons why a simple attachment to asymmetrically straighten eyeglasses is a widely- and increasingly-needed invention.

Description of Related Art

Besides plastic surgery to correct for auricular dystopia, one current more common solution for crooked glasses is to heat and then bend one of the eyeglass temple arms, or simply to bend one of the eyeglass temple arms without heating it first. For simplicity, both these methods are referred to herein as the "heat and bend method." This heat and bend method is currently recommended by online eyeglass sellers, as well as opticians, optometrists, or ophthalmologists, likely because no better methods or product-based solutions are currently commercially available. Consequently, since more and more people are buying eyeglasses online, this heat and bend method is now more and more often performed by lay people, rather than by opticians, optometrists, or ophthalmologists.

Often, eyeglasses which are initially adjusted correctly and level relative to a wearer's eyes by an eyeglass professional shift out of proper height adjustment. This may occur after frames or eyeglass temple arms are accidentally bent, or when they return from their correctly adjusted position to their manufactured position due to the "memory" of the eyeglass frame material. Eyeglass frame material is often designed to have "memory" so that the frames return to their manufactured shape if they are accidentally bumped or dropped. The user may not have the resources or patience to continually bring or send the eyeglasses back for re-adjustment by their eyeglass professional.

The heat and bend method poses a significant risk of damaging or breaking the eyeglass temple arm or hinge, especially when done repeatedly; and the risk exists whether the heat and bend method is done by a lay person or by an optician, optometrist, or ophthalmologist. Therefore, the wearer may not want to heat and bend the temple at all, either by oneself or by a professional, because the wearer may not want to risk breakage.

Despite the widespread and frequent use of the heat and bend method to straighten eyeglasses on a wearer's face, the heat and bend method has several major drawbacks, including: (a) it is unreliable since different frame materials respond differently to heating and bending, (b) it must often be repeated since the eyeglass temple arm material tends to go back to its manufactured position, sometimes very quickly; and (c) it poses a significant risk of damaging or breaking the eyeglass temple arm or its hinge, resulting in a time-consuming and costly problem.

Attachments to eyeglasses are typically applied to the nose pads, nosepieces, eyeglass temple arms, or eyeglass temple curves (part of the eyeglass temple arms.) These current attachments generally focus only on increasing the stability or retention of eyeglasses; and not on eyeglass straightening, holding and shielding for small devices, or on holding fashionwear. These attachments can also be large and bulky, altering the original fit and feel of the eyeglasses. Eyeglass temple arm attachments such as these are marketed and sold in pairs to be used on both temples, and both of the paired attachments are the same size, therefore presuming symmetry with respect to the eyeglass wearer's anatomy. These types of eyeglass attachments are used as appendages or augmentations to both eyeglass temples, and they are used as "once-on" attachments that are meant to stay in place once attached to the eyeglasses. Hence, subsequent or routine adjustment is difficult with these eyeglass attachments, and the design features required for an eyeglass straightening attachment that is easily attached, adjusted and manipulated by an eyeglass wearer are not enabled by their designs. These designs are also not adaptable to variable height adjustment for eyeglass straightening, nor are they meant to hold and/or shield small devices and fashionwear. Clearly, a novel and optimal approach to straightening eyeglasses is needed that closely maintains the original properly-adjusted fit and feel of the eyeglasses, while providing the eyeglass wearer the means to adjust their eyeglasses for uneven ears.

Objects of the Invention

This invention has several objects that address the problems and deficiencies within the field of this invention:

An object of this invention is to provide a simple-to-use and easy-to-adjust means for smoothly variable asymmetric height adjustment of one eyeglass temple arm, relative to the second eyeglass temple arm, to straighten the eyeglasses relative to the wearer's eyes. This invention's smoothly variable asymmetric height adjustment(s) facilitates eyeglass straightening, even given the multitude of wearers' unique anatomies and the multitude of eyeglass temple arm shapes and sizes available.

Another object of this invention is to provide the means to asymmetrically straighten eyeglasses that appear crooked relative to the wearer's eyes due to eyeglass weight imbalance. Weight imbalance may be due to corrective lens differences between the right lens and the left lens. Also, attachment of a device or fashionwear to just one side of eyeglasses may cause a weight imbalance that causes the eyeglasses to be crooked on the wearer's face. These devices include but are not limited to, audio/visual electronic components, "smart eyeglasses" devices or components, personal identification component(s), recording devices, lights, loupes, visual aids, hearing aids, and global positioning component(s.)

Yet another object of this invention is to provide an eyeglass temple arm attachment that is easily attached to, detached from, and movable along an eyeglass temple arm, without requiring the use of tools or alteration of the eyeglass temple arm.

A further object of this invention is to provide asymmetric height adjustment using a single one-piece elastic component that can be attached to nearly any eyeglass temple arm, irrespective of the eyeglass temple arm size or geometry.

Another object of this invention is to provide comfortable eyeglass temple arm thickness extension that maintains the original fit and feel of the eyeglasses, especially as it relates to the width of the eyeglass temple arm.

A further object of the invention is to provide eyeglass straightening when used in combination with other eyeglass attachments that are only designed to provide stability or retention.

Another object of the invention is to use an elastomeric biocompatible polymer material, at least on the skin contact portions, so that it may be worn under normal conditions of use without causing a significant degree of toxicity, skin irritation, or allergic reaction.

Yet another object of this invention is to provide the means to level eyeglasses relative to a wearer's eyes that does not mechanically alter or damage the eyeglass temple arm, or involve heating, bending, or heating and bending.

An additional object of the invention is to provide variable height adjustment from a layered structure. For example, the invention can be comprised of peel-off layers or a self-adhesive material that may be added or subtracted from the invention thus providing variable height adjustment.

Another object of the invention is overlappability, whereby two or more one-piece inventions, or components, may be nested together and attached to an eyeglass temple arm, providing the means to achieve increasing asymmetric height adjustments.

Another object of this invention is to provide for holding and/or shielding small devices or fashionwear. Small devices include, but are not limited to, communication electronics, batteries, audio/visual electronic components, "smart eyeglasses" devices or components, personal identification component(s), recording devices, lights, loupes, visual aids, hearing aids, and global positioning component(s.) Fashionwear includes, but is not limited to, artwork, jewelry, stones, jewels, perfume diffusers, logos and trademarks, The small device(s) or fashionwear may be held by or within the eyeglass attachment, the small device(s) or fashionwear may be securely hung from the eyeglass attachment (rather than hanging on the eyeglass temple arm itself), or the small device(s) or fashionwear may be part of the eyeglass attachment itself by embedding, embossing, debossing, pasting, or otherwise adorning directly on the invention.

A further object of this invention is to provide the means to hold, protect and substantially isolate small device(s) or fashionwear from environmental elements such as rain, chemicals, facial lotions and perspiration; yet the small device(s) or fashionwear are also easily removed from the invention.

An additional object of this invention is to provide the means to protect a wearer from electromagnetic radiation, magnetism or electricity generated by the small device(s). In particular, the invention's material may be inherently electrically, electromagnetically or magnetically shielding, or may be coated or impregnated with electrically, electromagnetically or magnetically shielding material.

Another object of this invention is to provide flexibility in placement along the eyeglass temple arm. The eyeglass attachment can be placed closer to the eyeglass lens frame along the eyeglass temple arm (for conspicuous placement on the eyeglass temple arm) or can be placed farther back along the eyeglass temple arm toward the temple curve, behind the hair, for example (for less conspicuous placement on the eyeglass temple arm.) Inconspicuous placement allows the wearer to conceal recording devices, for example.

A further object of the invention is a multi-component attachment comprised of two or more overlapped one-piece inventions to provide the means to hold at least one small device, at least one fashionwear article, or combinations thereof between the two or more overlapped inventions.

Terminology Used to Describe the Invention

A brief summary of some of the terminology used to describe the invention is provided below. These terms are further explained in context throughout this disclosure.

Displace/displaces/displacement/displaceable—Refers to the movement of the elastic middle segment away from the eyeglass temple arm.

Ear bridge—The boney, curved, uppermost portion of the back part of the ear which connects to the head (onto which the eyeglass temple arm normally rests.)

Ear hook(s)—Part of the eyeglass temple arm, when present, that curves downward behind the ear. May also be referred to as the temple curve. The ear hook is understood to be included when referring to the eyeglass temple arm.

Elastic, elastomeric—Refers to a material property characterized by the ability to elongate, stretch or deform without failing (e.g., tearing or breaking) and then substantially return to an original size and shape.

Eyeglass(es)—A device that comprises an eyeglass lens frame, lenses, and eyeglass temple arms including, but not limited to, prescription eyeglasses, nonprescription eyeglasses, reading glasses, driving glasses, surgical loupe glasses, safety glasses, and sunglasses. In the field of this invention, eyeglasses are also sometimes referred to as glasses, spectacles, bifocals, trifocals, specs, shades and cheaters.

Elastic middle segment—The central part of the invention located (i.e., disposed) between the first elastic end segment and second elastic end segment. The elastic middle segment may be solid or comprise at least one open cavity.

Fashionwear—Includes, but is not limited to, artwork, jewelry, stones, jewels, perfume diffusers, logos and trademarks.

First elastic end segment—The part of the invention located closest (proximal) to the eyeglass lens frame when attached to the eyeglass temple arm. It comprises a passageway that provides the means for attachment of the invention to the eyeglass temple arm. Operably, the first elastic end segment and second elastic end segment are interchangeable, since "first" refers to the first elastic end segment that is attached to the eyeglass temple arm, but either elastic end segment can be attached to the eyeglass temple arm first.

Graspable tab—An optional part of the elastic end segments of the invention that facilitates attaching the invention onto the eyeglass temple arm, or moving the invention along the eyeglass temple arm.

Intrinsic—Refers to the original, unaltered dimensions of an eyeglass temple arm. For example, intrinsic eyeglass temple arm thickness is the thickness of an eyeglass temple arm in its original manufactured state having no thickness extension.

Isolate—Refers to the ability of an open cavity in the elastic middle segment to protect and envelope small device(s) or fashionwear.

Longitudinal axis length—Refers to the length dimension of elastic middle segment of the invention prior to eyeglass attachment or deformation.

Movably grips—Refers to the elastic end segments of the invention that can grip an eyeglass temple arm and are also moveable along the eyeglass temple arm.

Non-enclosing—Refers to a preferred embodiment of the invention wherein the elastic middle segment does not wrap around, encircle or surround the eyeglass temple arm in part or in whole. As per the non-enclosing embodiment, the elastic middle segment is contiguous or contactable with the lower surface of the eyeglass temple arm only, and not with the eyeglass temple arm sides.

One-piece—Refers to the invention that consists of a single body, and not multiple, physically separable parts.

Open cavity—A pocket, void or hollow section within the elastic middle segment of the invention that is openly accessible. The open cavity can receive and protectively hold small devices or fashionwear. The opening which provides access to the open cavity in the elastic middle segment can be on any surface of the elastic middle segment. An open cavity may also allow inventions to overlap because the elastic middle segment of one invention can fit, or nest, inside the open cavity present in the elastic middle segment of another invention.

Passageway—Refers to a conduit, hole, opening, or channel in the elastic end segments of the invention. The cross section of the passageway can have any geometry.

Second elastic end segment—The part of the invention that is located farthest (distal) from the eyeglass lens frame when attached to the eyeglass temple arm. It comprises a passageway that provides the means for attachment of the invention to the eyeglass temple arm.

Segment—Refers descriptively to regions, areas, portions, parts, zones or sections of the invention's one-piece body, and not physically separable components of the invention.

Small device—Includes, but is not limited to, communication electronics, batteries, audio/visual electronic components, "smart eyeglasses" devices or components, personal identification components, recording devices, lights, loupes, visual aids, hearing aids, and global positioning components.

Smoothly variable asymmetric height adjustment—Refers to changing the height of one eyeglass temple arm to straighten eyeglasses. Asymmetric height adjustment refers to the extension of the intrinsic eyeglass temple arm thickness on one of the eyeglass temple arms, and smoothly variable refers to height adjustment that is not required to be in pre-determined or distinct steps.

Solid—Generally refers to a volume of material that is substantially continuous and does not comprise any intentionally formed or molded pocket(s), void(s) or hollow section(s.)

Straighten/straightening—Refers to leveling eyeglasses relative to a wearer's eyes, so that the eyeglasses appear symmetric on the wearer's face relative to the wearer's eyes. Leveling and straightening are synonymous in the context of this invention.

Surround—Refers primarily to the passageways of the first and second elastic end segments that attach to and circumferentially wrap around or encircle an eyeglass temple arm.

Temple arm—The part of eyeglasses that is connected to the lens frame and that rests on a wearer's ear bridge.

Temple curve—Part of the eyeglass temple arm, when present, that curves downward behind the ear. May also be referred to as the ear hook. In the context of this invention, the temple curve is understood to be included when referring to the eyeglass temple arm.

Thickness (of eyeglass temple arm)—Eyeglass temple arm thickness refers to the "vertical" dimension of the eyeglass temple arm when eyeglasses are worn.

Thickness extension—Refers to extension of the intrinsic eyeglass temple arm thickness between the eyeglass temple arm and the eyeglass wearer's ear bridge.

Wettable surface—Any surface of the invention that would become wetted when submerged in water.

Width (of eyeglass temple arm)—Eyeglass temple arm width refers to the "horizontal" dimension of the eyeglass temple arm when eyeglasses are worn.

BRIEF SUMMARY OF THE INVENTION

This invention relates to leveling (i.e., straightening) eyeglasses relative to the eyeglass wearer's eyes necessitated by asymmetries of the wearer's ears relative to their eyes, or by other weight or height imbalances that create eyeglass crookedness relative to the wearer's eyes. Functionally, this invention extends the intrinsic eyeglass temple arm thickness, thereby raising the height of that eyeglass temple arm as it rests on the wearer's ear bridge while maintaining the original fit and feel of the eyeglasses.

The invention is a one-piece attachment comprised of three segments: (a) a first elastic end segment, (b) a second elastic end segment, and (c) an elastic middle segment. The two elastic end segments attach the invention to an eyeglass temple arm. The elastic middle segment may be solid or may comprise at least one open cavity, and may have a variation in thickness along its longitudinal axis length.

This invention provides the means to straighten eyeglasses relative to the eyeglass wearer's eyes by several embodiments, each of which allow smoothly variable asymmetric height adjustment of the eyeglasses. Without the invention in place, an eyeglass temple arm, having an intrinsic thickness, rests on the ear bridge with no means to adjust the height of the eyeglass temple arm relative to the wearer's ear bridge. This invention's smoothly variable asymmetric height adjustment(s) is novel since it provides a simple means to attain a range of height adjustments that can straighten eyeglasses relative to an eyeglass wearer's eyes.

The passageways in each of the two elastic end segments attach the invention to an eyeglass temple arm and easily stretch to accommodate the eyeglass temple arm shape while securely holding the invention in place at various positions along the eyeglass temple arm. No special tools are required to attach the invention to an eyeglass temple arm, no special tools are required to adjust the invention along the eyeglass temple arm after its attachment to the eyeglass temple arm, and no special tools are required to detach the invention from the eyeglass temple arm. The invention will not damage or deform an eyeglass temple arm, and does not involve heating or bending the eyeglass temple arm or frame.

The elastic middle segment is designed to be displaceable away from the eyeglass temple arm and is therefore independent of the eyeglass temple arm. The elastic middle segment is further designed so that it can adjustably displace away from the eyeglass temple arm to provide smoothly variable asymmetric height adjustment.

A preferred embodiment is an elastic middle segment that is non-enclosing to the eyeglass temple arm, so that the elastic middle segment does not receive, couple with or even partially surround the eyeglass temple arm, and therefore can be used with an eyeglass temple arm having any size or shape. However, the elastic middle segment can substantially conform to the contour or shape of the eyeglass temple arm due to its flexibility, and the elastic middle segment of the invention is contactable with only the lower eyeglass temple arm surface (not the eyeglass temple arm sides) in this preferred embodiment.

The elastic middle segment, disposed between the two elastic end segments, provides the means for adjustable thickness extension of an eyeglass temple arm's intrinsic thickness which then straightens the eyeglasses relative to the wearer's eyes. The invention provides smoothly variable asymmetric height adjustment of eyeglasses by two modes: (1) the variation in thickness of the elastic middle segment along its longitudinal axis length, and (2) the adjustable displacement of the elastic middle segment away from the eyeglass temple arm. Both of these modes provide the means for adjustable thickness extension of the intrinsic eyeglass temple arm thickness, thereby adjusting the "lift" of the eyeglass temple arm off of the wearer's ear bridge.

For example, when the invention is used in the "nominal" position, the invention lifts one of the eyeglass temple arms by the elastic middle segment's thickness disposed between the eyeglass temple arm and the wearer's ear bridge, thus providing a height adjustment that is substantially due to the variation in thickness along the longitudinal axis length of the elastic middle segment that is disposed between the eyeglass temple arm and the eyeglass wearer's ear bridge.

By pulling the two elastic end segments of the invention farther apart along the eyeglass temple arm, however, the invention's elastic middle segment adjustably displaces farther away from the eyeglass temple arm relative to its "nominal" position. In this "stretch" position, the eyeglass temple arm is lifted off of the ear bridge by the thickness of elastic middle segment plus the gap between the chord formed by the elastic middle segment and the eyeglass temple arm.

Further, by moving the two elastic end segments of the invention closer together along the eyeglass temple arm, the invention's elastic middle segment adjustably deforms forming a "bulge" shape. In this "bulge" position, the eyeglass temple arm is lifted off of the ear bridge by the thickness of elastic middle segment plus the bulge distance between the elastic middle segment and the eyeglass temple arm.

Both the stretch and bulge positions extend the intrinsic thickness of the eyeglass temple arm, thereby lifting that eyeglass temple arm off of the wearer's ear bridge. Both of these positions provide greater eyeglass temple arm thickness extension (i.e., height adjustment) compared to the nominal position whereby the eyeglass temple arm thickness extension is only due to the elastic middle segment thickness along its longitudinal axis length.

The variability of the eyeglass temple arm thickness extension may also be achieved by using a structure that is layered. This embodiment of the invention provides for additional self-adhering or "peel-off" layers added to the elastic middle segment of the one-piece invention body that can add or remove varying thickness extension to the eyeglass temple arm.

The eyeglass temple arm attachment provides a reliable means for smoothly variable asymmetric height adjustment that does not require special tools, does not involve bending the eyeglass frame or temple, and does not require heat. The preferred invention is comprised of an elastomeric biocompatible polymer material, at least on the skin contact portions, so that it may be worn under normal conditions of use without causing a significant degree of toxicity, skin irritation, or allergic reaction. The preferred invention is also washable, comfortable to wear, waterproof and detachable.

The invention can have a surface texture on the wettable surfaces, can be any color including clear, can be opaque or translucent, and can contain embedded particles (e.g., "speckles") or porosity (e.g., bubbles.)

The invention's material of construction may further comprise strengthening and/or stiffening agents (e.g., an embedded wire, particulates or fibers), as well as antimicrobial agents. The invention's material of construction may also be coated, impregnated or embedded with electrical, electromagnetic or magnetic shielding agents.

The two elastic end segments of the invention may also be constructed of various geometries and features. For example, the two elastic end segments of the invention can have graspable tabs that facilitate moving the invention along the eyeglass temple arm when attaching to, detaching from and adjusting the relative positions of the two elastic end segments along the eyeglass temple arm.

The invention also provides the means for receiving and protectively holding small devices or fashionwear so that they are substantially isolated from environmental elements such as rain, chemicals, facial lotions and perspiration. Small devices may include, but are not limited to, communication electronics, batteries, audio/visual electronic components, "smart eyeglasses" devices or components, personal identification component(s), recording devices, lights, loupes, visual aids, hearing aids, and global positioning component(s.) Fashionwear may include, but is not limited to, artwork, jewelry, stones, jewels, perfume diffusers, logos and trademarks. The substantial isolation of small device(s) held by the invention also provides the means to shield a wearer from electromagnetic radiation, magnetism or electricity generated by a small device(s).

The invention's ease of placement along the eyeglass temple arm due to the invention's elasticity and movable design allow the user to position the invention at either a conspicuous place (e.g., to hold fashionwear) or at a less conspicuous place such as substantially behind the wearer's ear (e.g., to hold a concealed recording device, or to asymmetrically straighten the eyeglasses relative to the wearer's eyes.)

These and other advantages of the present invention will be understood from the description of the preferred embodiments, taken with the accompanying drawings.

BRIEF DESCRIPTION OF THE DRAWINGS

FIG. 8A illustrates an embodiment of the invention attached to an eyeglass temple arm and resting on an eyeglass wearer's ear bridge in a "nominal" position. FIG. 8B illustrates an embodiment of the invention attached to an eyeglass temple arm and resting on an eyeglass wearer's ear bridge in a "stretch" position. FIG. 8C illustrates an embodiment of the invention attached to an eyeglass temple arm and resting on an eyeglass wearer's ear bridge in a "bulge" position.

DESCRIPTION OF SYMBOLS USED IN THE DRAWINGS

Figure 1A:
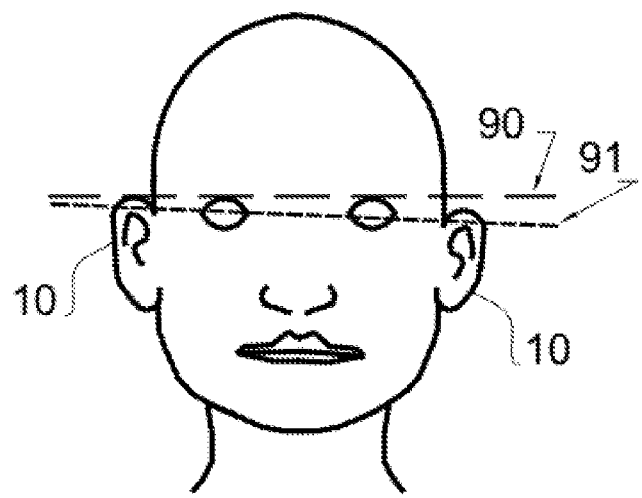
FIG. 1A illustrates auricular dystopia, whereby the plane of a person's eyes are not parallel to the plane of the person's ears, due to uneven ears.

10—ear
11—ear bridge
15—eyeglasses (comprising 20, 22, 24, and 30)

20—eyeglass lens frame
22—the wearer's left lens of eyeglasses
24—the wearer's right lens of eyeglasses
30—eyeglass temple arm
35—curved part of eyeglass temple arm 30, also known as the "ear hook" or "temple curve"
37—intrinsic thickness of an eyeglass temple arm
38—intrinsic width of an eyeglass temple arm
40—lower surface of eyeglass temple arm
41—side(s) of eyeglass temple arm
60—elastic middle segment feature enclosing eyeglass temple arm
90—plane of eyes
91—plane of ears (as measured at the ear bridges)
100—embodiment of invention
100a—invention located in a conspicuous position on 30 proximal to 20
100b—invention located in a conspicuous position on 30
100c—invention located in an inconspicuous position on 30
101—embodiment of invention with solid elastic middle segment 112
102, 102a, 102b, 102c, 102d—embodiments of invention wherein the elastic middle segment 112 comprises at least one open cavity 113
103—embodiment of invention wherein the elastic middle segment 112 comprises at least one open cavity 113.
104—embodiment of invention having an additional self-adhering or "peel-off" layered structure included with the elastic middle segment 112
110—elastic end segment of the invention
111—elastic end segment of the invention
112—elastic middle segment of the invention
113—open cavity in 112
120—graspable tab of 110
121—graspable tab of 111
130—passageway of 110
131—passageway of 111
151—embodiment of invention with solid elastic middle segment 112 (may be the same as or different from invention embodiment 101)
152—embodiment of invention wherein the elastic middle segment 112 comprises an open cavity 113 (may be the same as or different from invention embodiment 102)
210—eyeglass temple arm thickness extension provided by invention (nominal position)
220—eyeglass temple arm thickness extension provided by invention (stretch position)
230—eyeglass temple arm thickness extension provided by invention (bulge position)
240—eyeglass temple arm thickness extension provided by overlapped inventions
250a—first peel-off layer
250b—second peel-off layer
250c—third peel-off layer
400—small device or fashionwear held by invention embodiment 102
405—small device or fashionwear held by invention embodiment 152
410—small device or fashionwear held between two overlapping invention embodiments 101 and 151
500—small device or fashionwear held by invention
501—loop or hook connecting small device or fashionwear to invention
502—small device or fashionwear on elastic middle segment 112 of invention
600—wettable surfaces of the invention
700—longitudinal axis of the one-piece body of the invention and elastic middle segment 112
L—longitudinal axis length dimension of elastic middle segment 112 of the invention prior to eyeglass attachment or deformation
C1—first dimension of a passageways 130 and/or 131 prior to attachment or deformation
C2—second dimension of a passageways 130 and/or 131 prior to attachment or deformation
D1—depth of a passageway 130
D2—depth of passageway 131
T—the physical, or material, thickness dimension of the invention's elastic middle segment 112 prior to any deformation or stretching
W—the physical, or material, width dimension of the invention's elastic middle segment 112 prior to any deformation or stretching

DETAILED DESCRIPTION OF THE INVENTION

This invention relates to leveling (i.e., straightening) eyeglasses relative to the eyeglass wearer's eyes necessitated by asymmetries of the wearer's ears relative to their eyes, or by other weight or height imbalances that create eyeglass crookedness relative to the wearer's eyes. This invention is an eyeglass temple arm attachment for straightening eyeglasses by smoothly variable asymmetric height adjustment (i.e., eyeglass temple arm thickness extension) that may also be used for receiving and protectively holding small devices or fashionwear. The invention can be used on either the left or right eyeglass temple arm for eyeglass straightening. Functionally, this invention extends the intrinsic eyeglass temple arm thickness, thereby raising the height of that eyeglass temple arm relative to the other eyeglass temple arm as it rests on the wearer's ear bridge. The invention can also have a width (i.e., the horizontal dimension of the invention) that closely matches the intrinsic width of the eyeglass temple arm, especially at the point where the invention rests on the eyeglass wearer's ear bridge, so as not to alter the original fit and feel of the eyeglasses.

The invention is a one-piece attachment comprised of three segments: (a) a first elastic end segment that surrounds and movably grips an eyeglass temple arm and that is proximal to the eyeglass lens frame, (b) a second elastic end segment that surrounds and movably grips the same eyeglass temple arm and that is distal to the eyeglass lens frame, and (c) an elastic middle segment that is displaceable away from the eyeglass temple arm and disposed between the first elastic end segment and second elastic end segment. The first elastic end segment and second elastic end segment are typically interchangeable functionally, and are referred to as "first" and "second" based on the order that the eyeglass wearer chooses to attach them to an eyeglass temple arm.

The first elastic end segment and second elastic end segment each further comprise a passageway that provides the means for attachment of the invention to an eyeglass temple arm. The first elastic end segment and second elastic end segment may further comprise graspable tabs to facilitate movement or adjustment of the invention along the eyeglass temple arm. The elastic middle segment of the invention may be solid or may comprise at least one open cavity, and may have a variation in thickness along its longitudinal axis length.

One preferred embodiment of the invention comprises an elastic middle segment that is non-enclosing to the eyeglass temple arm. As per this embodiment, the elastic middle segment is contiguous or contactable with the lower surface of the eyeglass temple arm only, and not with the eyeglass temple arm sides.

Accordingly, this invention embodiment is independent of the size or shape of the eyeglass temple arm since the elastic middle segment does not receive, couple with, or even partially surround the eyeglass temple arm; while at the same time the flexibility of the elastic middle segment allows it to substantially conform to the contour or shape of the eyeglass temple arm, especially when the embodiment is used in its "nominal" mode or position.

The elastic middle segment of the invention provides for smoothly variable asymmetric height adjustment of an eyeglass temple arm by two modes: (1) the variation in thickness of the elastic middle segment along its longitudinal axis length, and (2) the adjustable displacement of the elastic middle segment away from the eyeglass temple arm caused by moving the two elastic end segments relative to each along the eyeglass temple arm. Both of these modes provide for smoothly variable asymmetric height adjustment by adjusting the thickness extension of the eyeglass temple arm which adjusts the "lift" of the eyeglass temple arm off of the eyeglass wearer's ear bridge.

The elastic end segments of the invention that surround the eyeglass temple arm are movably adjustable along the eyeglass temple arm, allowing the eyeglass wearer to adjust the degree of asymmetric height adjustment by the position of the invention along the eyeglass temple arm, and also by the relative positions of the first elastic end segment and second elastic end segment to each other along the eyeglass temple arm.

The invention can be easily attached and detached from the eyeglass temple arm without the use of tools, and will not damage or deform an eyeglass temple arm.

This invention provides the means for customized and fine-tuned asymmetric eyeglass height adjustment, even given the multitude of wearers' unique anatomies and the multitude of eyeglass temple arm shapes and sizes. This invention's smoothly variable asymmetric height adjustment enables the eyeglass fit that the eyeglass professional originally intended, since the intended fit is typically based on eyeglasses which fit straight relative to the wearers' eyes (i.e., plane of the eyeglasses are parallel to the plane of the eyes.)

Figure 1B:
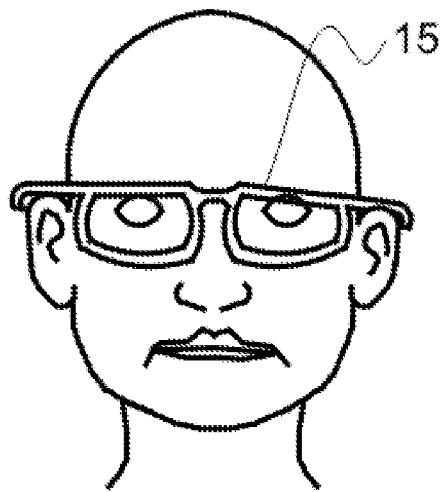
FIG. 1B illustrates eyeglass crookedness resulting from auricular dystopia.
Figure 1C:
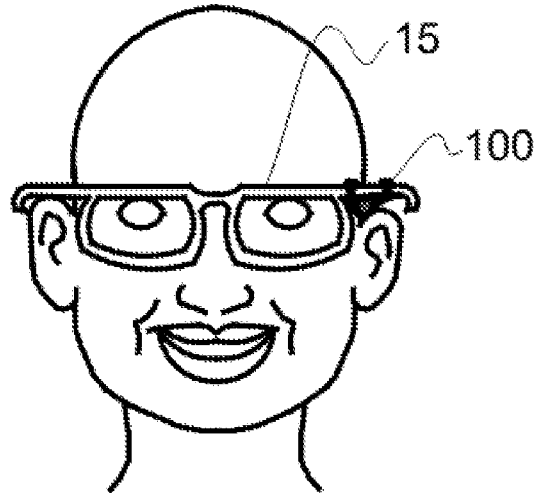
FIG. 1C illustrates that this invention can straighten eyeglasses that were crooked due to auricular dystopia.

FIG. 1A illustrates a person having uneven ears 10, whereby the plane of the eyes 90 is not parallel to the plane of the ears 91. As depicted in FIG. 1B, this asymmetry of the ears relative to an eyeglass wearer's eyes results in eyeglasses 15 that appear crooked on the wearer's face (i.e., "height imbalance.") FIG. 1C illustrates how the invention (embodiment 100) provides asymmetric height adjustment for straightening of the eyeglasses 15, necessitated by the wearer's uneven ears.

Wearing a device that is not attached to the eyeglasses, such as a hearing aid or audio device under just one side of the eyeglasses 15, may also cause eyeglass crookedness or "height imbalance." For these situations, the invention would be placed on the lower eyeglass temple arm, thus lifting up that eyeglass temple arm on the wearer's ear to straighten the eyeglasses with respect to the wearer's eyes.

Figure 2A:
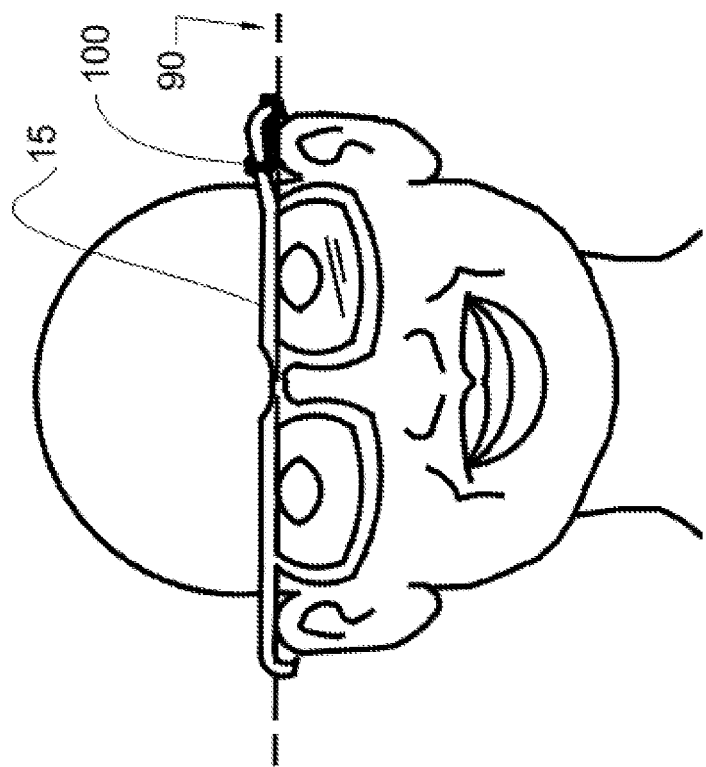
FIG. 2A is a drawing of a person wearing eyeglasses that are crooked due to weight imbalance.
Figure 2B:
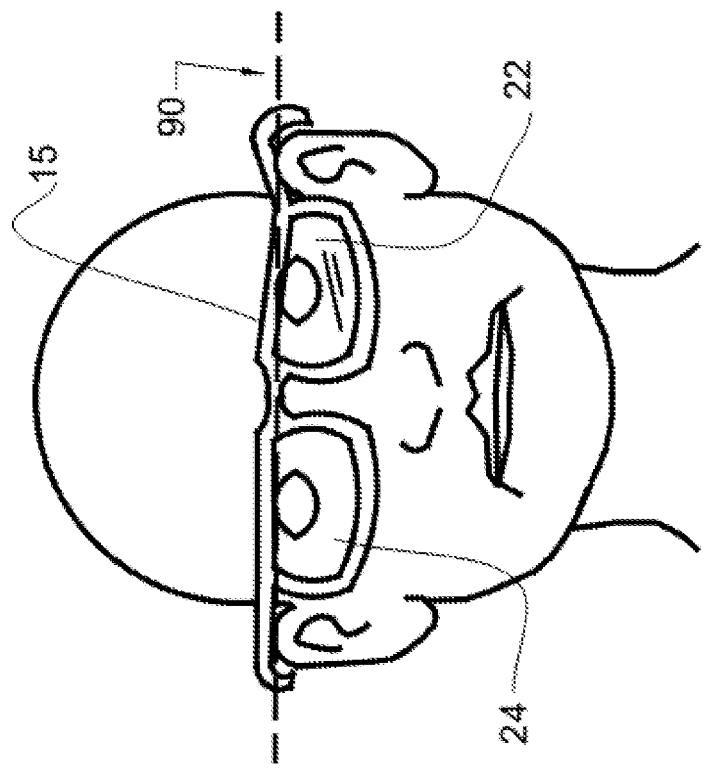
FIG. 2B illustrates the same person having weight-imbalanced eyeglasses after attaching the invention to straighten the eyeglasses relative to the person's eyes.

FIG. 2A illustrates a person wearing eyeglasses 15 that are crooked relative to the plane of the person's eyes 90, resulting from a weight imbalance. A difference in prescription between left and right lenses (e.g., the eyeglass wearer's left lens 22 may be a stronger (heavier) prescription than the eyeglass wearer's right lens 24) is an example cause of weight imbalance. For these situations, the invention (e.g., embodiment 100) would be placed on the lower eyeglass temple arm of eyeglasses 15, thus raising that side of the eyeglasses 15 up so that the eyeglasses 15 are parallel to the plane of the wearer's eyes 90 as depicted in FIG. 2B. Similarly, wearing a device such as a loupe or a small camera on just one side of the eyeglasses 15 may also cause a weight imbalance (i.e., making one side of the eyeglasses heavier than the other) that can be adjusted by this invention.

Figure 3A:
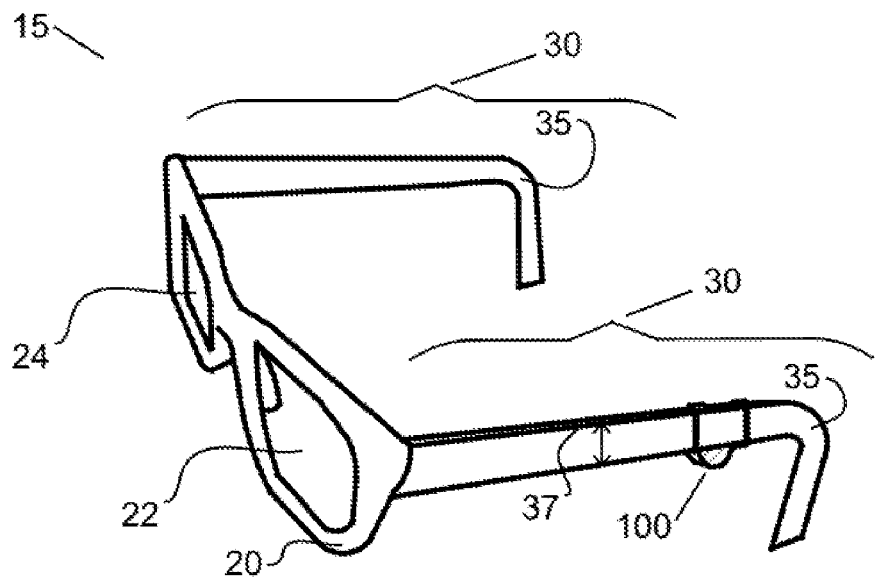
FIG. 3A shows the various components of eyeglasses and the invention attached to one eyeglass temple arm.
Figure 3B:
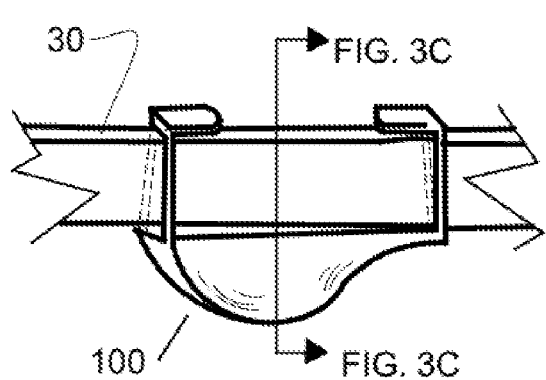
FIG. 3B is a closer view of an invention embodiment on the eyeglass temple arm, showing a sectional cut through both.
Figure 3C:
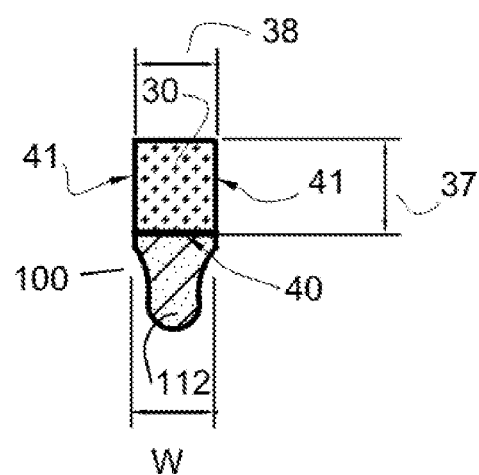
FIG. 3C shows the cross section view of the invention on the eyeglass temple arm.

Referring to FIG. 3A, eyeglasses 15 consist of: the eyeglass lens frame 20, left lens 22, right lens 24, and two eyeglass temple arms 30. Eyeglass temple bends 35 are also shown on FIG. 3A, but 35 is understood to be a subpart of the eyeglass temple arm 30 and is included when referencing the eyeglass temple arm 30. Referring to FIG. 3A, invention embodiment 100 is designed to be attachable to, movable along, and detachable from the eyeglass temple arm 30, and can be attached to either one of the eyeglass temple arms 30. The intrinsic thickness of the eyeglass temple arm 30 is denoted by 37, which may vary along the length of the eyeglass temple arm. FIG. 3B is a closer view of invention embodiment 100 on the eyeglass temple arm 30, showing a sectional cut through both. FIG. 3C is a cross section view of the eyeglass temple arm 30 and the elastic middle section 112 of invention embodiment 100 attached to the eyeglass temple arm. FIG. 3C illustrates that the width W of the elastic middle segment 112 of the invention (e.g., embodiment 100) can be the same as the intrinsic width 38 of the eyeglass temple arm 30 where the invention is nearest to the eyeglass temple arm, and the width may also vary or taper over its cross section as illustrated in FIG. 3C. (Note: W can refer to any width of the elastic middle segment 112 along its length or thickness, and not just the width nearest to the eyeglass temple arm.) An eyeglass temple arm also has sides 41 and a lower surface 40.

Figure 4A:
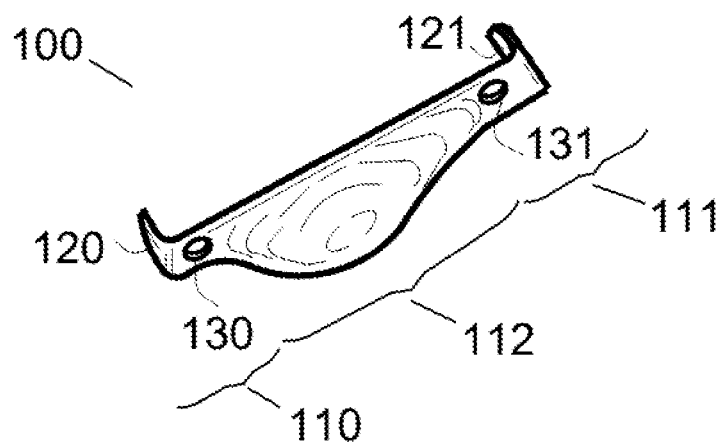
FIG. 4A shows a perspective view of an embodiment of the invention prior to attachment to an eyeglass temple arm, looking up toward the bottom of the invention.
Figure 4B:
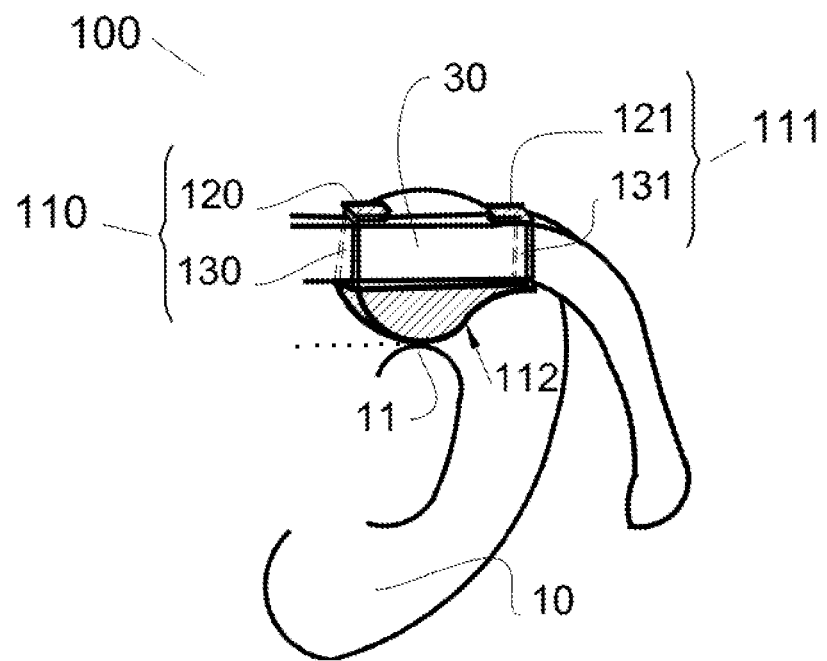
FIG. 4B shows an embodiment of the invention attached to an eyeglass temple arm and resting on the ear bridge of an eyeglass wearer.

FIG. 4A shows invention embodiment 100 prior to attachment to an eyeglass temple arm (viewing from the bottom looking upward at embodiment 100 of the invention), and FIG. 4B shows invention embodiment 100 attached to eyeglass temple arm 30, in place on wearer's ear bridge 11 of ear 10.

Referring to FIG. 4A and FIG. 4B, invention embodiment 100 is a one-piece attachment comprised of three segments: a first elastic end segment 110 further comprising passageway 130 that surrounds and movably grips the eyeglass temple arm, an elastic middle segment 112 that is displaceable from and non-enclosing to the eyeglass temple arm, and a second elastic end segment 111 further comprising passageway 131 that surrounds and movably grips the eyeglass temple arm. First elastic end segment 110 further comprises optional graspable tab 120; and second elastic end segment 111 further comprises optional graspable tab 121. The elastic middle segment 112 is the region, area, portion, part, zone or section of the invention defined as being between passageways 130 and 131. Note that the term "segment" is used as a distinguishing descriptor for regions along the invention and not as physically separated components of the invention since the invention is a one-piece attachment. The passageways 130 and 131 of elastic end segments 110 and 111, respectively, which surround and grip the eyeglass temple arm are movably adjustable along the eyeglass temple arm and movably adjustable relative to each other. The positions of the two elastic end segments relative to each other along the eyeglass temple arm also adjustably displace the elastic middle segment of the invention away from the eyeglass temple arm, allowing the eyeglass wearer to smoothly vary the asymmetric height adjustment.

To attach the invention (e.g., embodiment 100 of FIG. 4A) to an eyeglass temple arm, the eyeglass temple arm 30 is first fed through passageway 130 of the first elastic end segment 110 and second, fed through the passageway 131 of the second elastic end segment 111. Passageway 130 and passageway 131 then surround and movably grip the eyeglass temple arm 30. The elasticity of the invention's material comprising the first elastic end segment 110 and second elastic end segment 111 allows the passageways 130 and 131 to elongate and conform to the shape of the eyeglass temple arm 30 without tearing. Graspable tabs 120 and 121 of the invention (e.g., embodiment 100 of FIG. 4A), if present, may also facilitate its attachment to, and movement along, the eyeglass temple arm 30.

Referring to FIG. 4B, invention embodiment 100 is then positioned (i.e., moved) along the eyeglass temple arm 30 so that the elastic middle segment 112 is disposed between the eyeglass wearer's ear bridge 11 and eyeglass temple arm 30, with the elastic segment 112 resting on the eyeglass wearer's ear bridge 11 of ear 10. The segments 110 and 111 grip the eyeglass temple arm and will not slide back to the original position without applying force. FIG. 4B shows invention embodiment 100 in place, as it would appear being used in the nominal position.

Although invention embodiment 100 in FIG. 4A and FIG. 4B is depicted with a particular geometry for illustration purposes, it is understood that the non-enclosing (to the eyeglass temple arm) elastic middle segment 112 of the invention can have a range of longitudinal axis lengths, a variation in thickness along said longitudinal axis length, and a variation in width across said thickness to provide smoothly variable asymmetric height adjustment for a variety of eyeglass temple sizes and geometries.

Figure 5A:
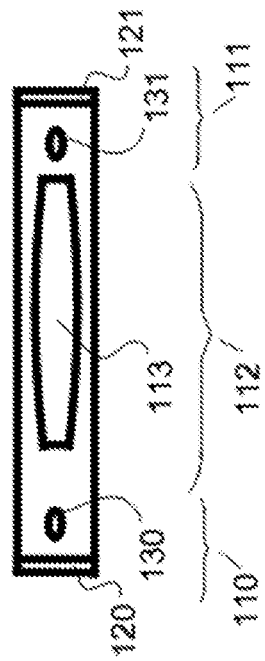
FIG. 5A and FIG. 5B show a top view and side view, respectively, of an embodiment of this invention comprising two elastic end segments and a solid elastic middle segment.
Figure 5B:
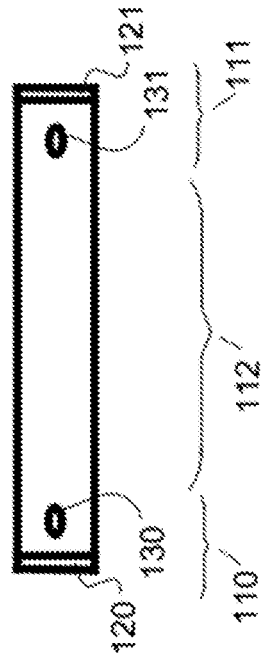

FIG. 5A, FIG. 5B, FIG. 5C, and FIG. 5D depict invention embodiments 101 and 102 prior to attachment to an eyeglass temple arm. FIG. 5A and FIG. 5B are a top view and side view, respectively, of invention embodiment 101 wherein the elastic middle segment 112 is solid. In the context of this invention, "solid" refers to a volume of material that is substantially continuous and does not comprise any intentionally formed or molded pocket(s), void(s) or hollow section(s.)

Figure 5C:
FIG. 5C and FIG. 5D show a top view and side view, respectively, of an embodiment of this invention comprising two elastic end segments and an elastic middle segment further comprising an open cavity.
Figure 5D:

FIG. 5C and FIG. 5D are a top view and side view, respectively, of invention embodiment 102 wherein the elastic middle segment 112 comprises an open cavity 113. An open cavity in the context of this invention refers to pocket, void or hollow section that is openly accessible. These figures show the elastic end segments 110 and 111 that comprise passageways 130 and 131, respectively. Passageways 130 and 131 provide the attachment means to the eyeglass temple arm 30 as shown in FIG. 4B, for example.

Invention embodiment 101 in FIG. 5A and FIG. 5B, and invention embodiment 102 in FIG. 5C and FIG. 5D, also illustrate how the flexibility of elastic middle segment 112 may be varied. In particular, if there is no open cavity 113 in elastic middle segment 112 (FIG. 5A and FIG. 5B), the flexibility of the elastic middle segment 112 can be varied by varying the size and geometry of the elastic middle segment 112, and also by varying the material used to construct the invention. If the elastic middle segment 112 has at least one open cavity 113 (FIG. 5C and FIG. 5D), however, then the flexibility of elastic middle segment 113 can be further varied by varying the size, geometry and number of the at least one open cavity 113. As will be described in subsequent invention embodiments, the middle segment 112 may also provide for a means to receive and protectively hold small devices or fashionwear.

One preferred feature of the invention further comprises graspable tabs 120 and 121 as part of elastic end segments 110 and 111, respectively, as illustrated in FIG. 4A and FIG. 4B, and also in invention embodiments 101 and 102 of FIG. 5A, FIG. 5B, FIG. 5C and FIG. 5D. Graspable tabs 120 and 121 provide additional convenient means to attach the invention onto, move the invention along, or detach the invention from, the eyeglass temple arm.

Figure 6A:
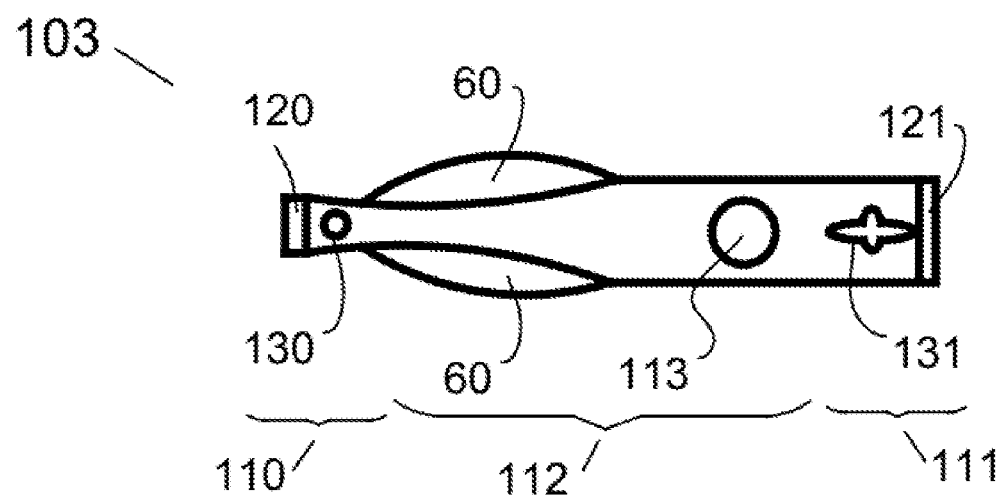
FIG. 6A and FIG. 6B is a top view and side view, respectively, of an embodiment of this invention illustrating various configurations of the elastic end segments and elastic middle segment.
Figure 6B:
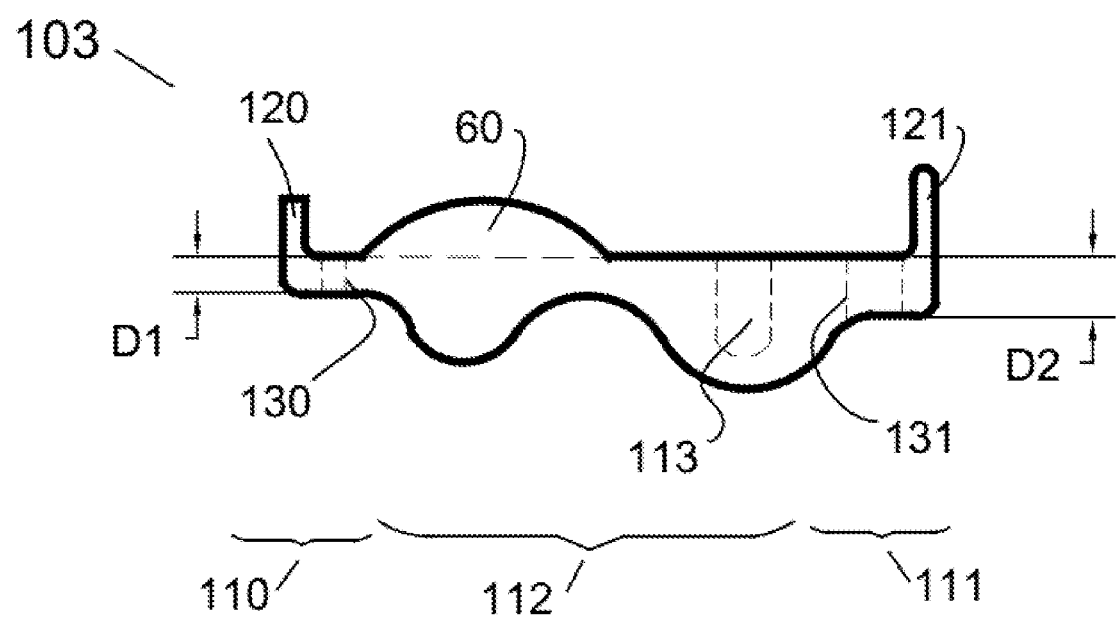

FIG. 6A (top view) and FIG. 6B (side view) is invention embodiment 103 illustrating that various geometries and profiles for elastic segments 110, 111, and 112 are contemplated for the invention. Numerous other geometries and profiles of the invention when viewed from the side or top are contemplated. The optional graspable tabs 120 and 121 depicted in FIG. 6A and FIG. 6B may have different geometries, sizes, or profiles to facilitate graspability. Passageways 130 and 131 may also have varying geometries as depicted by invention embodiment 103 in FIG. 6A and FIG. 6B. The depths of passageways 130 and 131, D1 and D2, may also be different as depicted by invention embodiment 103 of FIG. 6B (e.g., in FIG. 6B, D1 is less than D2.) The depth of the passageways, which is essentially the thickness of the elastic end segments, is an important novel design feature of the invention which provides for the easy movement of the invention along the eyeglass temple arm. Further, as depicted in FIG. 6A, the elastic end segments 110 and 111 may have different sizes, geometries, and profiles from one another; and also may be different sizes, geometries, and profiles from the elastic middle segment 112. Although invention embodiment 103 in FIG. 6A depicts a single open cavity 113 in elastic middle segment 112, it is contemplated that elastic middle segment 112 could comprise at least one open cavity 113. FIG. 6A and FIG. 6B also depict an elastic middle segment 112 having an enclosing feature 60 that may partially enclose the eyeglass temple arm when attached to the eyeglasses. When attached, this feature 60 would extend upward and surround, or be contiguous with, the sides of the eyeglass temple arm.

Figure 7:
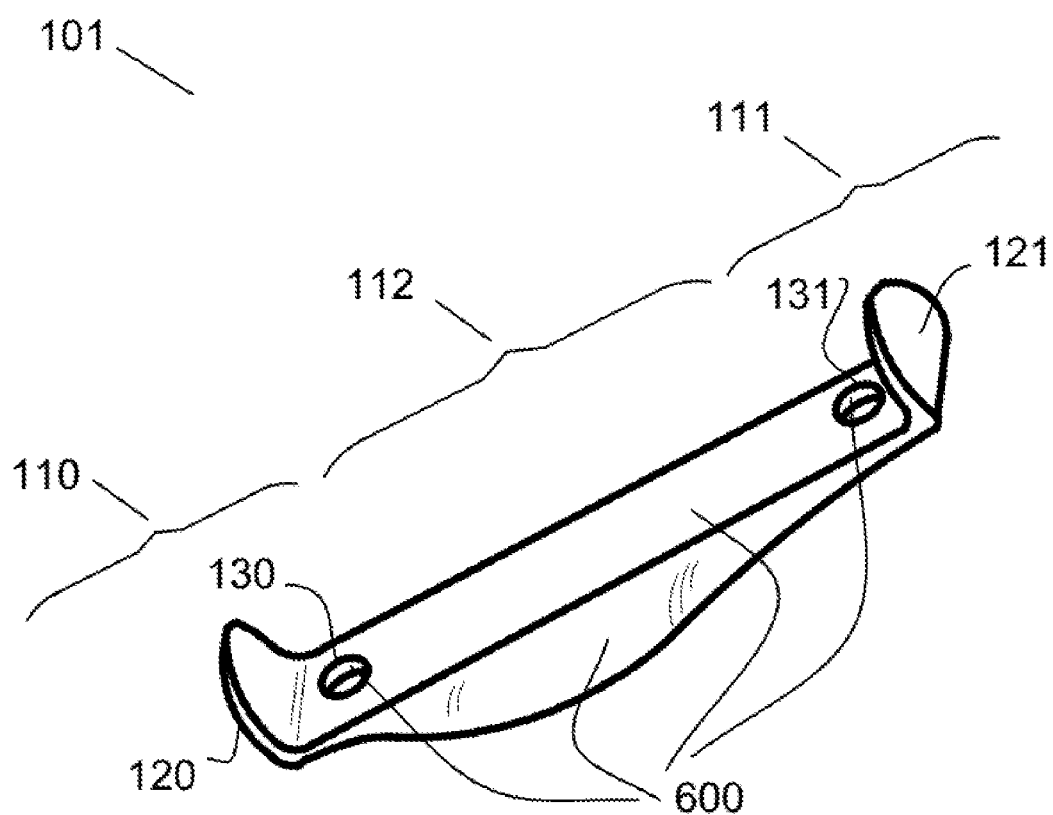
FIG. 7 is a perspective view of an embodiment of the invention and its wettable surfaces.

Invention embodiment 101 is shown in perspective view in FIG. 7. For all embodiments of the invention, the wettable surfaces 600, as depicted on invention embodiment 101 of FIG. 7, is not limited to any surface finish, contour, shape or geometry. A wettable surface is understood by those skilled in the art to mean any surface that would become wet if submerged in water. The wettable surfaces 600 of the invention embodiments include the surface of passageways 130 and 131, surfaces of the first elastic end segment 110, surfaces of the second elastic end segment 111, and surfaces of elastic middle segment 112. Although not depicted in FIG. 7, it is understood that wettable surfaces 600 would also include any interior surfaces of the at least one open cavity 113 if present in elastic middle segment 112 (for example see FIG. 5C and FIG. 5D). It is contemplated that variations of the surface finish, contour, shape and geometry for wettable surfaces 600 of the invention may provide varying degrees of comfort to the eyeglass wearer, or may provide additional functionality. It is further contemplated that variations of the surface finish or contour for wettable surfaces 600 may provide for varying degrees of retention for small devices or fashionwear, if the wearer uses the invention for receiving and protectively holding small devices or fashionwear.

FIG. 8A, FIG. 8B, and FIG. 8C are views of invention embodiment 100 at nominal, stretch and bulge positions, respectively, on an eyeglass temple arm. FIG. 8A, FIG. 8B, and FIG. 8C illustrate example means by which the invention can be used on an eyeglass temple arm to provide variable height adjustment corresponding to eyeglass temple arm thickness extensions 210, 220, and 230, respectively, for an eyeglass temple arm 30 relative to an eyeglass wearer's ear bridge 11. (Note that an arrow points to elastic middle segment 112 in these figures, and it is understood that this refers to the entire elastic middle segment 112 as in FIG. 5A, FIG. 5B, FIG. 5C, and FIG. 5D, for example.)

Without the invention in place, the eyeglass temple arm 30 having intrinsic thickness 37 rests directly on the ear bridge. With the invention attached to the eyeglass temple arm 30, however, the invention rests on the wearer's ear bridge 11 with a thickness extension 210 (see FIG. 8A), since the invention is positioned along the eyeglass temple arm so as to be disposed between the eyeglass temple arm 30 and ear bridge 11.

The design of this invention provides for smoothly variable asymmetric height adjustment to straighten eyeglasses relative to the wearer's eyes depending on the thickness of the elastic middle segment at the point along the longitudinal axis of the elastic middle segment between the eyeglass temple arm and the wearer's ear bridge. The variation in thickness of the elastic middle segment along its longitudinal axis length provides one mode for smoothly variable asymmetric height adjustment, by moving both elastic end segments 110 and 111 in either direction (depicted by the directional arrows in FIG. 8A) along the eyeglass temple arm. The lift of the eyeglass temple arm off of the ear bridge is then adjustable depending on the thickness of the elastic middle segment 112 that is between the eyeglass temple arm 30 and ear bridge 11.

The second mode for smoothly variable asymmetric height adjustment relates to moving the elastic ends segments 110 and 111 relative to each other. This mode provides further adjustability of the thickness extension by displacing the elastic middle segment 112 away from the eyeglass temple arm. FIG. 8B and FIG. 8C illustrate that by moving the elastic end segments 110 and 111 farther apart or closer together, respectively, greater thickness extension is achieved. FIG. 8A, FIG. 8B, and FIG. 8C are further explained by the first, second and third invention embodiments described later herein.

Figure 9:
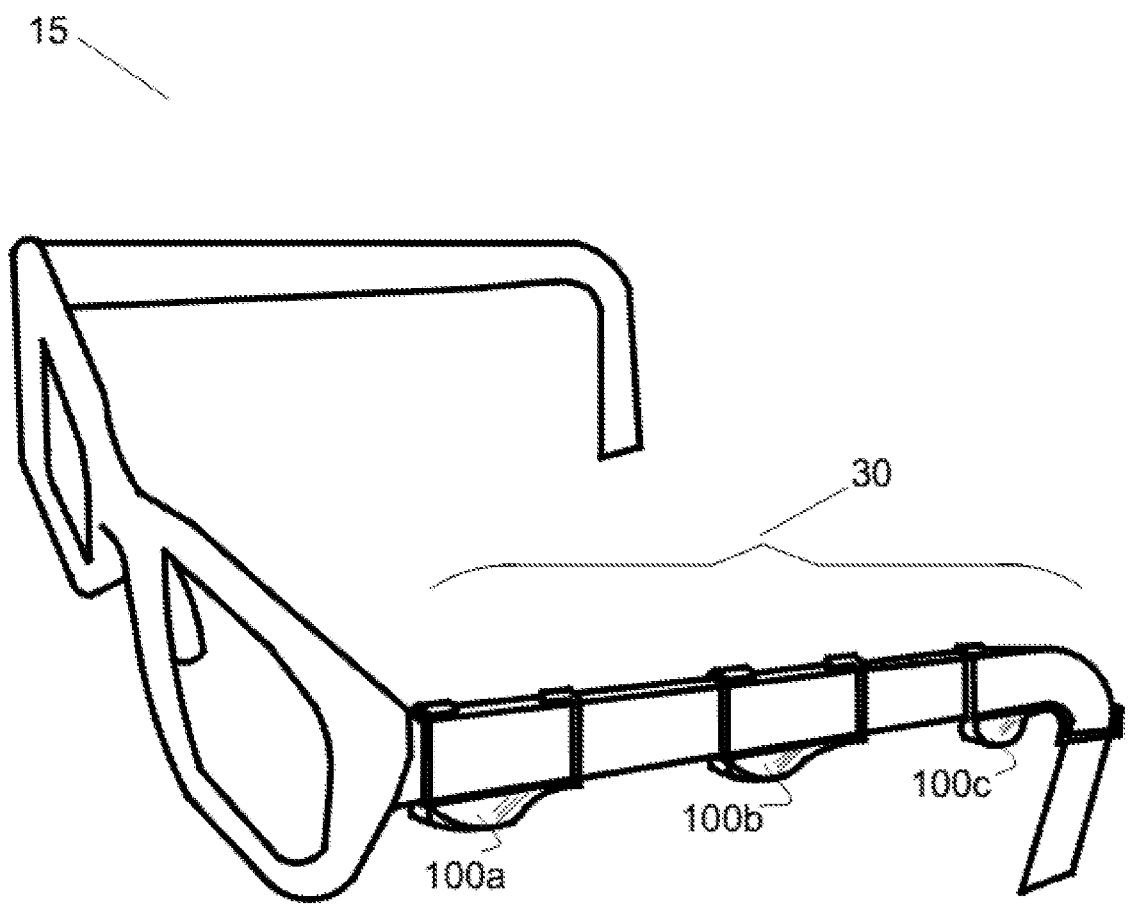
FIG. 9 shows that one or more inventions can be attached to an eyeglass temple arm at various conspicuous and inconspicuous positions.

FIG. 9 illustrates that a plurality of inventions (designated as invention embodiments 100a, 100b, and 100c) can be placed at any location along the eyeglass temple arm 30 of eyeglasses 15, providing for both conspicuous and inconspicuous positioning along the eyeglass temple arm. For example, invention embodiments 100a and 100b are located at more conspicuous positions, likely to hold fashionwear. The positions of invention embodiments 100a and 100b, which would be more visible to another person, can also be used to display fashionwear including, but not limited to, artwork, jewelry, stones, jewels, perfume diffusers, logos and trademarks. The less conspicuous invention embodiment 100c is at a location along the eyeglass temple arm 30 which is likely more hidden behind the ear and/or behind the wearer's hair. This position of invention embodiment 100c can be used when the invention is used for asymmetric height adjustment. The position of this invention embodiment 100c on the eyeglass temple arm would also likely be a chosen position to hold a device such as a hearing aid, audio recording device or other small device that the wearer wishes not to be visible.

Although FIG. 9 depicts three invention embodiments, 100a, 100b, and 100c, along the eyeglass temple arm 30, any number of inventions within the confines of the eyeglass temple arm 30 length may be placed on the eyeglass temple arm 30 and at any location(s). It is also contemplated that the one or more inventions attached to the eyeglass temple arm 30 may be used for a plurality of functions. For example, on a single eyeglass temple arm 30, one invention embodiment 100a may be used to hold small devices, another invention embodiment 100b may be used to hold fashionwear, and another invention embodiment 100c may be used for asymmetric height adjustment. Numerous other combinations of invention functions along the eyeglass temple arm are contemplated, including overlapping inventions.

The following are some further contemplated embodiments of the invention for illustration. It will be understood that these embodiments are not an exhaustive list, and that many variants, modifications and combinations of the invention embodiments may be effected within the spirit and scope of the invention as described in the appended claims.

First Invention Embodiment

This embodiment of the invention, as depicted by FIG. 8A, refers to a "nominal" position for the invention. The elastic middle segment 112 of the invention (e.g., embodiment 100) can have a variation in thickness and geometry along its longitudinal axis length. Depending on what part of the elastic middle segment 112 rests on the ear bridge 11, varying degrees of lift, or eyeglass temple arm thickness extension, are possible. The eyeglass wearer can easily place any thickness of the elastic middle segment 112 between the eyeglass temple arm 30 and their ear bridge 11, by simply moving both elastic end segments 110 and 111 of the invention (e.g., embodiment 100 in FIG. 8A) slightly forward or backward along the eyeglass temple arm 30. In this way, very fine adjustments to the eyeglass temple arm thickness extension can be easily achieved. The eyeglass temple arm thickness extension is depicted by distance 210 in FIG. 8A, which is the thickness of the elastic middle segment 112 where the elastic middle segment 112 rests on the ear bridge 11.

A preferred embodiment of the invention is for the elastic middle segment to be non-enclosing to the eyeglass temple arm as depicted in FIG. 8A. This means that the elastic middle segment 112 is contiguous or contactable with the lower surface of the eyeglass temple arm (40 in FIG. 3C) only, and not with the eyeglass temple arm sides (41 in FIG. 3C.)

Although the elastic end segments 110 and 111 grip the eyeglass temple arm 30, these elastic end segments are movable along the eyeglass temple arm 30, enabling smoothly variable asymmetric height adjustment of the eyeglasses corresponding to the variation in thickness and geometry of the elastic middle section 112 at the point of contact with the ear bridge 11. It is also contemplated that the elastic middle segment 112 of the invention (e.g., embodiment 100 of FIG. 8A) may comprise at least one open cavity 113 as depicted in FIG. 5C and FIG. 5D, for example.

Second Invention Embodiment

A "stretch" position of the invention is depicted in FIG. 8B with invention embodiment 100. By this invention embodiment, the first elastic end segment 110 and second elastic end segment 111 of the invention are moved farther apart along the eyeglass temple arm 30, so that the elastic middle segment 112 of invention embodiment 100 stretches and lifts, adjustably displacing away from the eyeglass temple arm 30, and forming a "chord" shape across the two points on the eyeglass temple arm defined by where the two ends of the invention are gripping the eyeglass temple arm. The stretch position is particularly useful on an eyeglass temple arm in which the eyeglass temple arm 30 has a curved section (i.e., temple curve, or "ear hook" 35). In this "stretch" position as shown in FIG. 8B, the eyeglass temple arm 30 is lifted off of the wearer's ear bridge 11 by the thickness extension consisting of the thickness of elastic middle segment 112 of the invention (e.g., dimension 210 of embodiment 100 in FIG. 8A) plus the gap between elastic middle segment 112 and the eyeglass temple arm 30 defined by the chord shape. This "stretch position" thus provides greater smoothly variable asymmetric height adjustment (depicted by distance 220 in FIG. 8B) than does the nominal position (depicted by distance 210 in FIG. 8A.)

Importantly, this invention embodiment provides for a smoothly variable asymmetric height adjustment which can be accomplished easily by the wearer: one simply moves first elastic end segment 110 and second elastic end segment 111 away from each other along the eyeglass temple arm to varying degrees, displacing the elastic middle segment 112 away from the eyeglass temple arm until one achieves the desired eyeglass straightening. Although the invention's elastic end segments 110 and 111 surround and grip the eyeglass temple arm, the elastic end segments are movable along the eyeglass temple arm 30: this allows for adjustable displacement of the elastic middle segment 112 away from an eyeglass temple arm thus providing adjustable thickness extension of the eyeglass temple arm. It is also contemplated that the elastic middle segment 112 of the invention (e.g., embodiment 100 in FIG. 8B) may comprise at least one open cavity 113 as depicted in FIG. 5C and FIG. 5D, for example.

Third Invention Embodiment

A "bulge" position of the invention is shown in FIG. 8C with invention embodiment 100. By this invention embodiment, the elastic end segments 110 and 111 of the invention are moved closer together along the eyeglass temple arm, so that the elastic middle segment 112 of the invention adjustably displaces away from the eyeglass temple arm 30 forming a "bulge" shape that rests on the wearer's ear bridge 11. In this "bulge" position as shown in FIG. 8C, the eyeglass temple arm 30 is lifted from the ear bridge 11 by the thickness extension consisting of the thickness of elastic middle segment 112 of the invention (e.g., dimension 210 of embodiment 100 in FIG. 8A) plus the gap between elastic middle segment 112 and the eyeglass temple arm 30 caused by the bulging of elastic middle segment 112. This "bulge" position thus provides greater height adjustment (depicted by distance 230 in FIG. 8C) than does the nominal position (depicted by distance 210 in FIG. 8A.)

This "bulge" position invention embodiment shown in FIG. 8C provides for smoothly variable asymmetric height adjustment which can be easily accomplished by the wearer: one simply moves the elastic end segments 110 and 111 closer together along the eyeglass temple arm to varying degrees, displacing the elastic middle segment 112 away from the eyeglass temple arm until one achieves the desired eyeglass straightening. Although the invention's elastic end segments 110 and 111 surround and grip the eyeglass temple arm, the elastic end segments are movable along the eyeglass temple arm 30, which allows for adjustable displacement of the elastic middle segment 112 away from an eyeglass temple arm as a bulge, thus providing adjustable thickness extension of the eyeglass temple arm. It is also contemplated that the elastic middle segment 112 of the invention (e.g., embodiment 100 in FIG. 8C) may comprise at least one open cavity 113 as depicted in FIG. 5C and FIG. 5D, for example.

Fourth Invention Embodiment

Figure 10A:
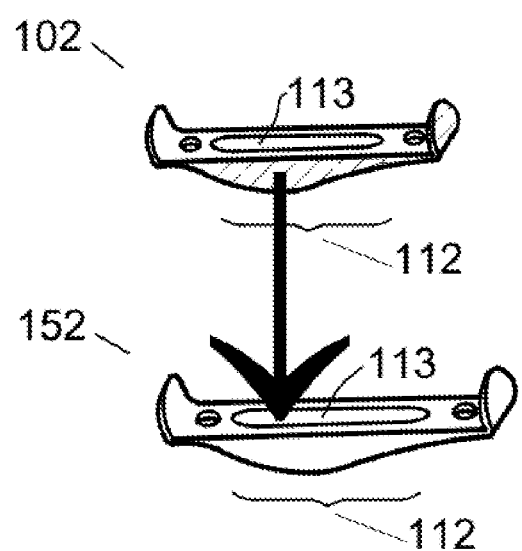
FIG. 10A shows multiple inventions that may overlap or "nest" inside one another.
Figure 10B:
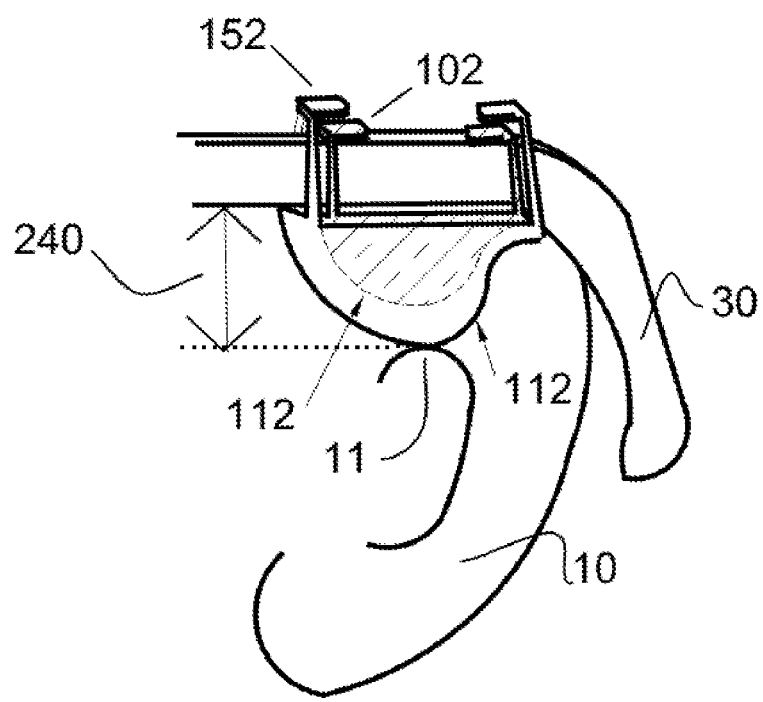
FIG. 10B is a perspective view of overlapped inventions when attached to an eyeglass temple arm, and in place on the wearer's ear.

Since the invention can be manufactured to have varying profiles (e.g., different shapes and geometries) and sizes, and the invention is overlappable, another embodiment of the invention is combining two or more inventions to provide smoothly variable height adjustment. This provides the wearer or eyeglass professional an even broader means for asymmetric height adjustment, especially for eyeglass wearers having a higher degree of auricular dystopia. Accordingly, FIG. 10A and FIG. 10B illustrate this multi-component invention embodiment whereby invention embodiments 102 ("first component") and 152 ("second component") are overlapped. As illustrated in FIG. 10A, invention embodiment 102 may be relatively smaller than invention embodiment 152, although, even inventions having the same size could be overlapped given their elasticity. At least two overlapping invention embodiments 102 or 152 are contemplated: a combination of two inventions are shown in FIGS. 10A and 10B for illustration, however, it is contemplated that more than two inventions could be overlapped to achieve the desired asymmetric height adjustment. The overlapping inventions do not need to be identical. In particular, each of the overlapped inventions may have a different size and geometry, and the elastic middle segment 112 of invention embodiment 102 and the elastic middle segment 112 of invention embodiment 152 may each comprise at least one open cavity 113.

Per the invention embodiment depicted by FIG. 10A, elastic middle segment 112 of invention embodiment 102 can fit inside an open cavity 113 in elastic middle segment 112 of a second invention embodiment 152. FIG. 10B shows the overlapped invention embodiments 102 and 152 when attached to an eyeglass temple arm 30. In this invention embodiment, an additive increase of the height adjustment between the ear bridge 11 of ear 10 and eyeglass temple arm 30 can be achieved relative to the height adjustment possible using a single invention (e.g., see FIG. 8A, thickness extension 210) since the nominal height adjustment will be the combination of the eyeglass temple arm thickness extension of segment 112 of invention embodiment 102 plus the thickness extension of segment 112 from invention embodiment 152, providing a total eyeglass temple arm thickness extension depicted by distance 240 in FIG. 10B.

It is also contemplated that an invention embodiment comprising a solid elastic middle segment (e.g., invention embodiment 101 in FIG. 5A and FIG. 5B) could be overlapped with an invention embodiment comprising an elastic middle segment further comprising at least one open cavity 113 (e.g., invention embodiment 102 of FIG. 5C and FIG. 5D); or at least two inventions could be overlapped.

Fifth Invention Embodiment

Figure 11:
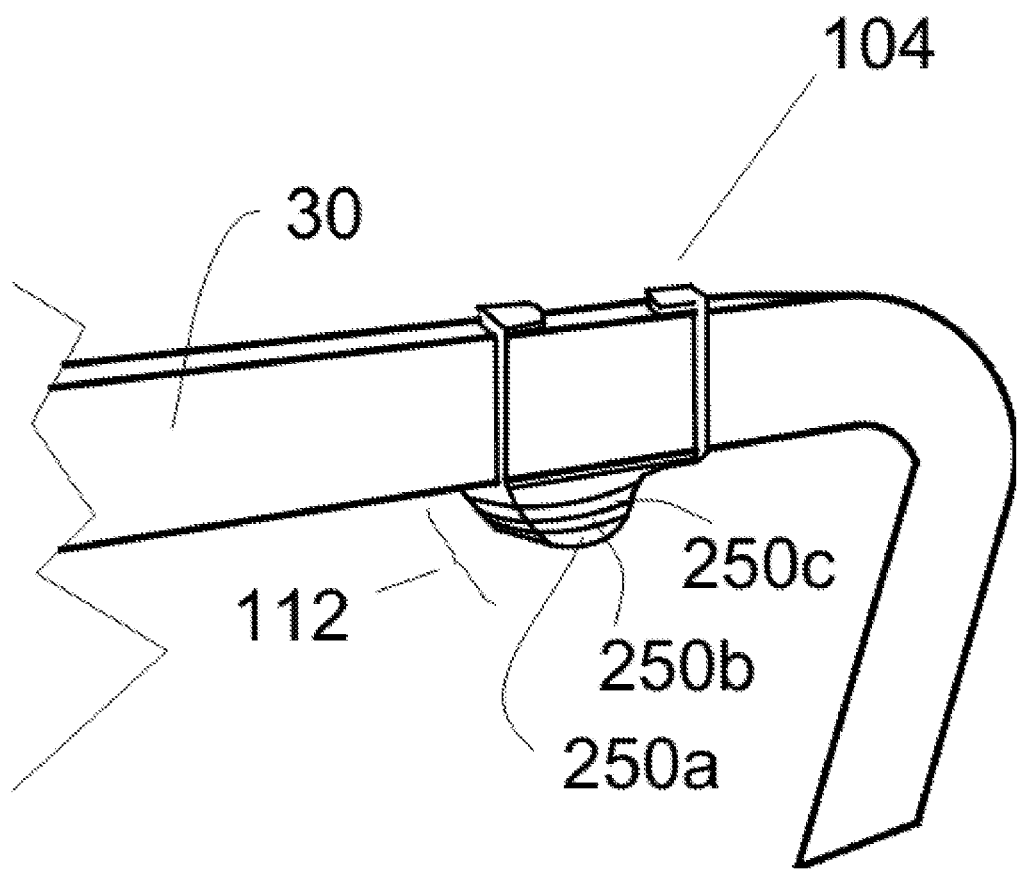
FIG. 11 is a drawing depicting an embodiment of the invention wherein the elastic middle segment of the invention comprises peel-off layers (i.e., layered structure) for height adjustment.

In another embodiment of this invention, a layered structure that provides varying degrees of asymmetric height adjustment can be included on the elastic middle segment 112 of the invention. Accordingly, FIG. 11 depicts invention embodiment 104 wherein the elastic middle segment 112 further comprises peel-off or self-adhesive layers 250a, 250b, and 250c. Per this embodiment of the invention, by peeling away material layers from, or adding material layers to, segment 112, the eyeglass temple arm thickness extension provided by elastic middle segment 112 can be reduced or increased. This invention embodiment for variable height adjustment thereby provides an adaptable means for adjustably extending the intrinsic thickness of eyeglass temple arm 30. Three layers of a layered structure are illustrated in FIG. 11, however, it is contemplated that a plurality of layers may be used to provide smoothly variable asymmetric height adjustment.

Sixth Invention Embodiment

Figure 12A:
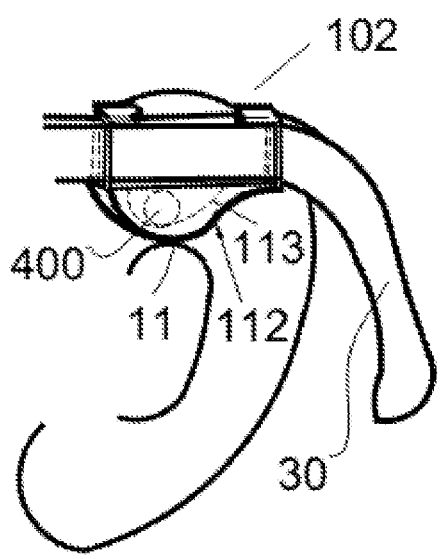
FIG. 12A is a drawing showing that small devices or fashionwear can be held by an embodiment of the invention comprising an open cavity in the elastic middle segment.
Figure 12B:
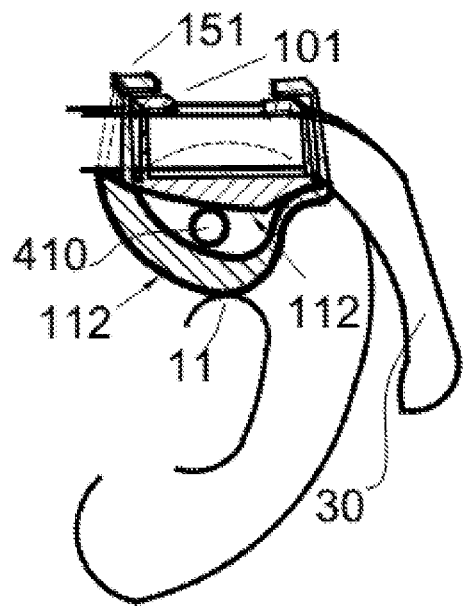
FIG. 12B illustrates that small devices or fashionwear can be held between two overlapping inventions.
Figure 12C:
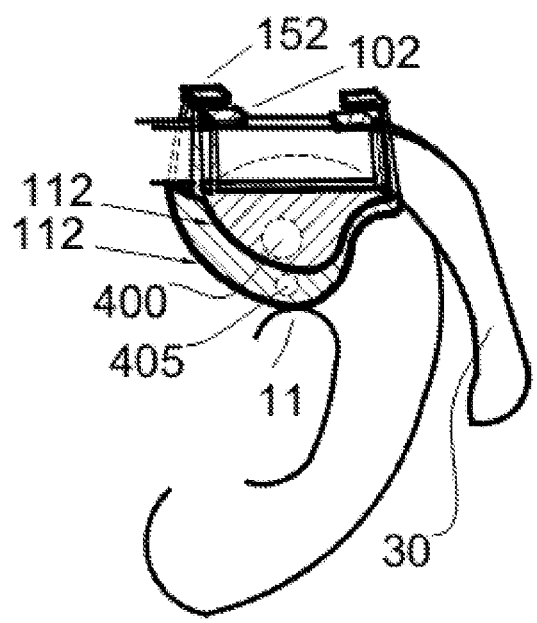
FIG. 12C illustrates that small devices or fashionwear can be held, shielded, and physically separated by overlapping inventions when the elastic middle segments of the overlapping inventions comprise open cavities.

The invention may be used to receive and protectively hold a small device or fashionwear depicted as 400, 405 and 410 in FIG. 12A, FIG. 12B, and FIG. 12C. It is understood that 400, 405 and 410 can each represent at least one small device or at least one fashionwear article, or a combination thereof (Note that an arrow points to elastic middle segment 112 in these figures, and it is understood that this refers to the entire elastic middle segment 112 as in FIG. 5A, FIG. 5B, FIG. 5C, and FIG. 5D, for example.) Small devices include, but are not limited to, communication electronics, batteries, audio/visual electronic components, "smart eyeglasses" devices or components, personal identification component(s), recording devices, lights, loupes, visual aids, hearing aids, and global positioning component(s.) Fashionwear includes, but is not limited to, artwork, jewelry, stones, jewels, perfume diffusers, logos and trademarks. FIG. 12A shows a small device or fashionwear 400 placed inside an open cavity 113 in elastic middle segment 112 of invention embodiment. The open cavity 113 of elastic middle segment 112 may receive and protectively hold a small device or fashionwear so that the small device or fashionwear are substantially isolated from environmental elements such as rain, chemicals, lotions and perspiration. The open cavity 113 of elastic middle segment 112 of invention embodiment 102 holding a small device or fashionwear 400 can also shield the wearer of invention embodiment 102 from electromagnetic radiation, magnetism or electricity generated by a small device.

FIG. 12B shows another embodiment of this invention using overlapping invention embodiments 101 and 151 that can hold a small device or fashionwear 410 between the solid elastic middle segment 112 of invention embodiment 101 and solid elastic middle segment 112 of invention embodiment 151, when attached to eyeglass temple arm 30. In FIG. 12B, invention embodiment 151 rests on the wearer's ear bridge 11, and is overlapping invention embodiment 101. Both inventions are attached to eyeglass temple arm 30. Invention embodiment 151 of FIG. 12B may be identical to invention embodiment 101, or invention embodiment 151 may have a different size (e.g., longitudinal axis length) or have a different geometry than invention embodiment 101. Although both invention embodiments 101 and 151 comprise an elastic middle segment 112, the specific geometry and size of the elastic middle segment 112 for invention embodiment 101 may differ from the size and geometry of the middle segment 112 for invention embodiment 151.

FIG. 12C depicts overlapping invention embodiments 102 and 152 (also see FIG. 10A and FIG. 10B,) further holding a small device or fashionwear 400 and 405, respectively, when attached to an eyeglass temple arm 30. In FIG. 12C, invention embodiment 152 rests on the wearer's ear bridge 11, and is overlapping invention embodiment 102. Both invention embodiments are attached to eyeglass temple arm 30. Invention embodiment 152 of FIG. 12C may be identical to invention embodiment 102, or invention embodiment 152 may have a different size (e.g., longitudinal axis length) or have a different geometry than invention embodiment 102. Small device or fashionwear 400 is held and substantially isolated by an open cavity 113 (see detail in FIG. 10A) of elastic middle segment 112 of invention embodiment 102, and small device or fashionwear 405 is held and substantially isolated by an open cavity 113 (see detail in FIG. 10A) of elastic middle segment 112 of invention embodiment 152. The small device or fashionwear depicted by 400 and 405 are thereby physically separated by the structure of elastic middle segment 112 of invention 102, and said physical separation can provide electromagnetic radiation-, magnetism- or electricity-shielding between small device or fashionwear 400 and 405. Although both invention embodiments 102 and 152 comprise an elastic middle segment 112 further comprising open cavity 113 as illustrated by FIG. 10A, the specific geometry and size of the elastic middle segment 112 and open cavity 113 for invention embodiment 102 may differ from the size and geometry of the middle segment 112 and open cavity 113 for invention embodiment 152.

Seventh Invention Embodiment

Figure 13A:
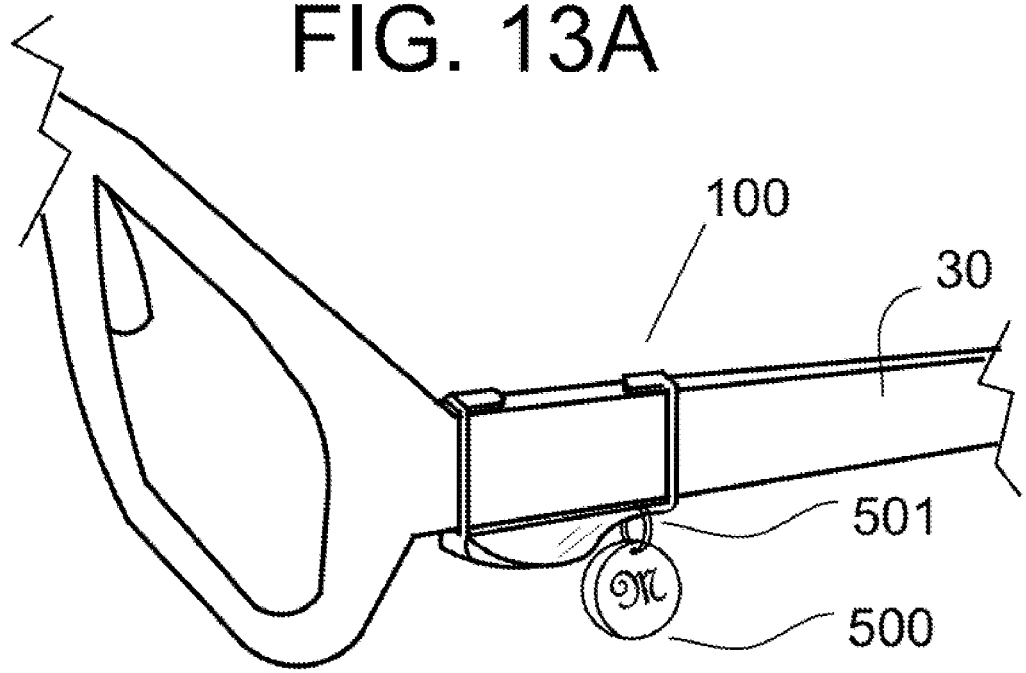
FIG. 13A is a drawing depicting how a small device or fashionwear can be held by the invention.
Figure 13B:
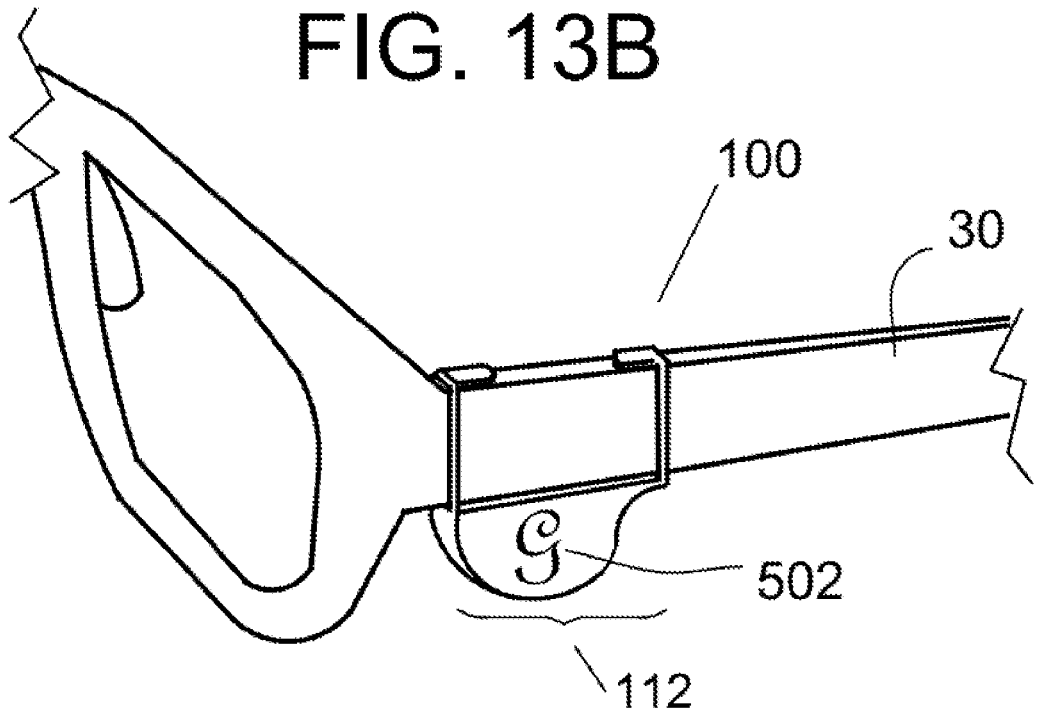
FIG. 13B shows a logo embedded or inscribed in the invention.

The invention also provides a means to display or attach fashionwear or a small device depicted as 500 and 502 in FIG. 13A and FIG. 13B, respectively. It is understood that 500 and 502 can each represent at least one small device or at least one fashionwear article, or a combination thereof. FIG. 13A shows an alternate means by which a fashionwear piece or small device 500 may held on the eyeglass temple arm 30 by invention embodiment 100, by hanging from invention embodiment 100 using attachment loop, or hook, 501. It is also contemplated that small devices, artwork, jewelry, stones, jewels, perfume diffusers, logos and trademarks, or other fashionwear could also be embedded in, inscribed in, embossed on, glued on or otherwise placed on the invention. For example, FIG. 13B illustrates a logo 502 embossed on the side of elastic middle segment 112 of invention embodiment 100 (however, 502 could be any small device or fashionwear on elastic middle segment 112.) The invention can be placed at different positions along the eyeglass temple arm 30 as depicted in FIG. 9. The invention comprises an elastic but strong material that allows the elastic end segments of the invention to position the invention along the eyeglass temple arm 30, even with a small device or fashionwear attached. The invention located at conspicuous positions along the eyeglass temple arm 30, as depicted by invention embodiments 100a and 100b in FIG. 9 for example, may be used when the invention is used to hold fashionwear. This allows for fashionwear to be easily seen.

Additional Invention Embodiments

There are also other preferred embodiments of the invention applicable to the preceding embodiments as described below.

It is contemplated that the invention can simultaneously provide the means for combinations of the embodiments described above, including but not limited to: straightening eyeglasses and holding small devices, straightening eyeglasses and holding fashionwear, and holding small devices and holding fashionwear.

It is further contemplated that the disclosed invention embodiments can be combined to form other invention embodiments. One contemplated combination invention comprises an elastic middle segment having a variation in thickness along its longitudinal axis length and a layered structure on the elastic middle segment (e.g., invention embodiment 104 of FIG. 11), and further using the invention in a "stretch" position on the eyeglass temple arm (e.g., invention embodiment 100 of FIG. 8B) to achieve more height adjustment than either invention embodiment provides alone. Another contemplated combination invention embodiment comprises one invention embodiment having an open cavity (e.g., invention embodiment 152 in FIG. 10A) overlapping another invention embodiment comprising an elastic middle segment comprising a layered structure (e.g., invention embodiment 104 of FIG. 11) to achieve more height adjustment than either invention embodiment provides alone, and also achieves protection of the layered structure. Numerous other combinations of embodiments could be constructed by those skilled in the art from the embodiments described in this disclosure.

The invention is also preferably constructed to be conformable and attachable to a range of eyeglass temple arm sizes and geometries, to be soft, to be elastic (i.e., elastomeric), and to be washable.

The invention surfaces can have a surface texture on the wettable surfaces, can be any color(s) including clear, can be opaque or translucent, and can contain embedded particles (e.g., "speckles") or porosity (e.g., bubbles).

The invention's material of construction may further comprise strengthening and/or stiffening agents (e.g., an embedded wire, particulates or fibers), as well as antimicrobial agents. The invention's material of construction may also be coated, impregnated or embedded with electrical, electromagnetic or magnetic shielding agents. Magnetic or electrical shielding may be important because a small device may generate electromagnetic radiation, a magnetic field or an electrical current, which would be best shielded from other small devices, or from the wearer's body (especially the wearer's head, ears, or brain.)

FIG. 14A, FIG. 14B, FIG. 14C, and FIG. 14D are a side view, cross-section view, a side view showing dimensions D1 and D2, and a perspective view of the invention in place on an eyeglass temple arm 30 (e.g., invention embodiment 100), respectively, representing the dimensional characteristics of the invention. The dimension L is the longitudinal axis length of the elastic middle segment 112 of the invention. The dimension T is the physical thickness, or vertical dimension, of the invention's elastic middle segment 112 prior to any deformation or stretching, which can vary along the longitudinal axis length L. The dimension W is the physical width, or horizontal dimension, of the elastic middle segment 112 prior to any deformation or stretching, which can vary along the longitudinal axis length L and the thickness T. The dimensions D1 and D2 are the depths of passageways 130 and 131, respectively, prior to attachment of the invention to the eyeglass temple arm. The depth D1 may be different from depth D2 as depicted in FIG. 6B. Note that dimensions L, T, and W in FIG. 14A, FIG. 14B, FIG. 14C or FIG. 14D refer to dimensions of elastic middle segment 112 prior to attachment of the invention to an eyeglass temple arm 30, or after attachment of the invention to an eyeglass temple arm 30 but prior to any deformation or stretching of the invention.

There are preferred dimensional, geometric and configurational embodiments for the invention that provide the novel smoothly variable asymmetric height adjustment for eyeglass straightening. For example, the thickness T of the elastic middle segment, longitudinal axis length L of the elastic middle segment, width W of the elastic middle segment, and depths D1 and D2 of the passageways are all important considerations. The material used to construct the invention and its associated mechanical properties, is also important. Details regarding some of these preferred dimensional, geometric, configurational and material properties of the invention and reasons for the preferred ranges are provided below.

When the plane of a person's ears are not parallel to the plane of a person's eyes, an eyeglass temple arm thickness extension of up to about 20 mm may be needed to compensate for the unevenness or asymmetry. The thickness dimension T shown in FIG. 14D therefore preferably ranges from about 1 mm and up to about 20 mm, depending on the needs and asymmetries of the eyeglass wearer. There may also be a variation in thickness dimension T along the longitudinal axis length L of elastic middle segment 112, which provides for adjustable thickness extension of the temple arm. Therefore the thickness can vary up to about 20 mm along the longitudinal axis length L. The dimension T is essentially the physical, or material, thickness of the invention's elastic middle segment 112 (prior to any deformation or stretching) between the ear bridge and eyeglass temple arm. As explained in the second, third and fourth invention embodiments, further height adjustment can be achieved when using the invention in the stretch or bulge position, or when overlapping inventions.

Figure 14A:
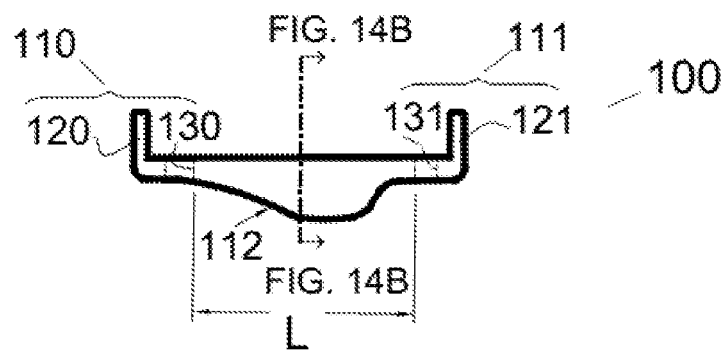
FIG. 14A and FIG. 14C are side views of an embodiment of the invention depicting dimensions.

The invention must be at least of sufficient longitudinal axis length along the eyeglass temple arm 30 as it rests on the wearer's ear bridge to provide the height adjustment benefits, and the invention must also be large enough to be easily manipulated by a person's fingers without additional tools. If the invention is too long it cannot remain hidden behind the wearer's hair when providing eyeglass temple arm thickness extension in the stretch position, for example. Also, if the invention is too long it cannot reliably provide eyeglass temple arm thickness extension when in the bulge position, since it becomes flimsy and cannot hold the bulge shape. An invention that is too short may be difficult to manipulate without tools. Also, an invention that is too short may not reach across the horizontal portion of the eyeglass temple arm to the curved part of the eyeglass temple arm (i.e., the temple curve) and therefore cannot provide eyeglass temple arm thickness extension in the stretch position. Accordingly, the preferred longitudinal axis length L of the elastic middle segment of the invention as illustrated in FIG. 14A, FIG. 14C, and FIG. 14D by invention embodiment 100 is about 5 mm to about 60 mm. For inconspicuous asymmetric height adjustment, the preferred longitudinal axis length L of the elastic middle segment is about 14 mm to about 35 mm. When the invention is used for holding small devices or fashionwear at locations along the eyeglass temple arm not in contact with the ear bridge, the longitudinal axis length L is only limited by the size of the at least one small device and the at least one fashionwear article and what can be comfortably worn by the eyeglass wearer, especially since the invention may not need to be located at an inconspicuous location along the eyeglass temple arm.

Another important advantage of this invention relates to the width of the invention, especially the width at the point where the invention rests on the wearer's ear bridge. The width of the elastic middle segment of the invention is depicted by width dimension W in cross section FIG. 14B for invention embodiment 100. The width W must be sufficient enough to provide structural support so that it can maintain shape or perhaps hold an open cavity, but should not be so large that it deforms or spreads the user's ear away from the wearer's head, making it uncomfortable to wear.

According to one preferred embodiment of the invention in which the elastic middle segment is non-enclosing to the eyeglass temple arm, the width W of the invention is preferably about the same as the intrinsic eyeglass temple arm width (which is about 1 mm to about 10 mm,) especially at the point where the invention rests on the wearer's ear bridge. The intrinsic width of an eyeglass temple arm refers to the original horizontal dimension of the eyeglass temple arm when worn by a person (e.g., see width 38 in FIG. 3C.) Note that other commercial eyeglass temple arm attachments used for stability or retention at least partially surround or enclose the eyeglass temple arm sides, so the width of the eyeglass temple arm plus the surrounding attachment will necessarily be larger than the intrinsic eyeglass temple arm width itself. This could lead to discomfort especially if the eyeglasses are worn for a prolonged period of time (as is usually the case.) As per this non-enclosing embodiment of the invention, the elastic middle segment 112 is contiguous or contactable with the lower surface of the eyeglass temple arm (40 in FIG. 3C) only, and not with the eyeglass temple arm sides (41 in FIG. 3C.)

Figure 14B:
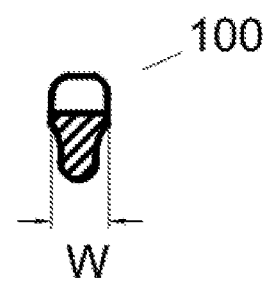
FIG. 14B is a cross sectional view of the invention depicting dimensions.
Figure 14C:
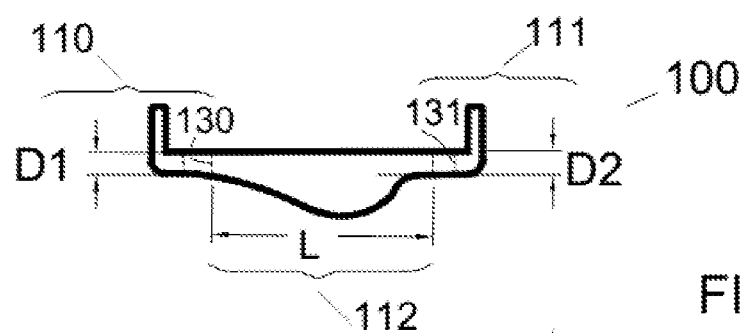
Figure 14D:
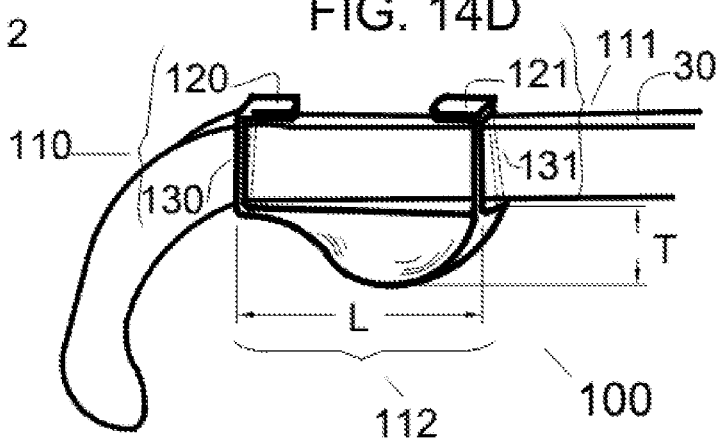
FIG. 14D is a perspective view of the invention when attached to an eyeglass temple arm depicting dimensions.

Accordingly, when the invention is used for asymmetric height adjustment, the width dimension W shown in FIG. 14B is preferably about 1 mm to about 10 mm, and more preferably the width of the invention will be similar to the intrinsic width of the eyeglass temple arm, especially at the point where the invention rests on the wearer's ear bridge, to minimize the impact to the eyeglass wearer and to the original fit and feel of the eyeglasses. There may also be a variation in width W of the elastic middle segment of the invention along the longitudinal axis length L of the elastic middle segment 112 of the invention. The width W can also be tapered so that that the width of the invention resting on the wearer's ear bridge is smaller than the width of the invention nearer to the eyeglass temple arm. When the invention is used for holding small devices or fashionwear at locations along the eyeglass temple arm not in contact with the ear bridge, the width dimension W is only limited by the size of the at least one small device or the at least one fashionwear article, and what can be comfortably worn by the eyeglass wearer.

The passageways 130 and 131 of elastic end segments 110 and 111, respectively, of the invention can have any geometry or shape to provide optimal gripability and movability of the invention along an eyeglass temple arm for a wide variety of eyeglass temple sizes, shapes and geometries. As shown by FIG. 14D by invention embodiment 100, when the invention is attached to the eyeglass temple arm 30, passageways 130 and 131 will tend to take the shape of the eyeglass temple arm due to the elasticity of the invention's material. Preferred passageway geometries are not slits, but instead may have curves or rounded corners. Slits are not preferred for the passageways because such a design would create stress concentration at the slit end points making them prone to tearing with repeated manipulation and adjustment along the eyeglass temple arm. For similar reasons, passageway geometries having smooth or rounded edges and corners are preferred.

Figure 15A:
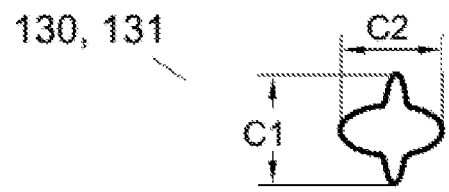
FIG. 15A, FIG. 15B, FIG. 15C and FIG. 15D are examples of geometries for the passageways of the invention.
Figure 15B:
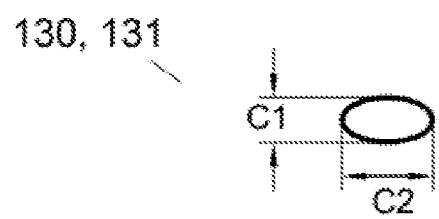
Figure 15C:
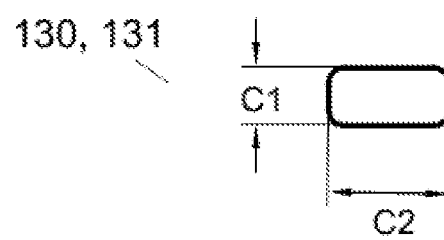
Figure 15D:
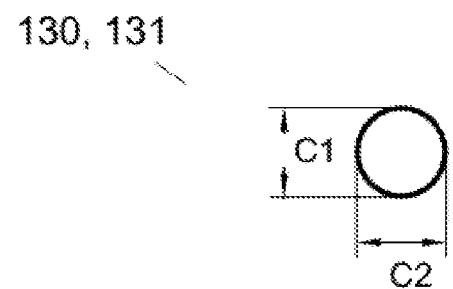

FIG. 15A, FIG. 15B, FIG. 15C and FIG. 15D depict various contemplated geometries for passageways 130 and 131 of the invention. Contemplated geometries of the passageways include, but are not limited to, a rounded corner cross shape (FIG. 15A), an oval or ellipse (FIG. 15B), a rounded corner rectangle (FIG. 15C), and a circle (FIG. 15D). Other passageway geometries, such as a star shape or a passageway with multiple "fingers" protruding from the outer perimeter inward toward the center of the passageway, may be contemplated by those skilled in the art to achieve optimal gripability of the invention to eyeglass temple arms having different geometries and sizes.

The invention passageways 130 and 131 should be able to slip onto eyeglass temple arms having a range of intrinsic thicknesses and widths. Eyeglass temple arms have an intrinsic thickness of about 2 mm up to about 30 mm, and intrinsic widths of about 1 mm to about 10 mm. The elasticity of the end segments of the invention will allow the passageways to stretch around and conform to a wide range of eyeglass temple arm thicknesses and widths. For example, some smart glasses have wide and thick temple arms, while wire rim glasses have narrow and thin temple arms. The passageways may be constructed to have various sizes as represented by dimensions C1 and C2 in FIG. 15A, FIG. 15B, FIG. 15C, and FIG. 15D. Referring to FIG. 15A, FIG. 15B, FIG. 15C, and FIG. 15D, dimensions C1 and C2 are preferably about 0.5 mm to about 25 mm, and more preferably about 1 mm to about 20 mm. Passageway 130 and passageway 131 of the invention need not have the same size, shape or geometry. FIG. 15A, FIG. 15B, FIG. 15C and FIG. 15D are examples of geometries, but numerous other geometries are contemplated within these preferred dimensional ranges. Note that dimensions C1 and C2 in FIG. 15A, FIG. 15B, FIG. 15C and FIG. 15D refer to dimensions prior to attaching the invention to an eyeglass temple arm 30 (i.e., prior to any deformation or stretching.)

The passageway depths D1 and D2 are also important (see FIG. 14C.) These depths are essentially the thickness of the material that surrounds the eyeglass temple arm when attached. If depth D1 or D2 is too large then the invention becomes more difficult to attach and detach from the eyeglass temple arm, and the invention may not easily move along the eyeglass temple arm due to the increased contact area with the eyeglass temple arm and therefore the increased frictional forces that must be overcome in order for the wearer to move the elastic end segment. If depth D1 or D2 is too shallow then the passageway will not provide adequate gripability of the elastic end segments to the eyeglass temple. Accordingly, there are depths D1 and D2 that provide preferred gripability and movability of the elastic end segments along the eyeglass temple arm. The preferred depths D1 and D2 for the invention are about 1 mm to about 7 mm, and more preferably these depths are about 1.5 mm to about 5 mm. The depths D1 and D2 would typically be the same, but they could be different within these preferred ranges depending on the particular design embodiment of the invention.

Figure 16A:
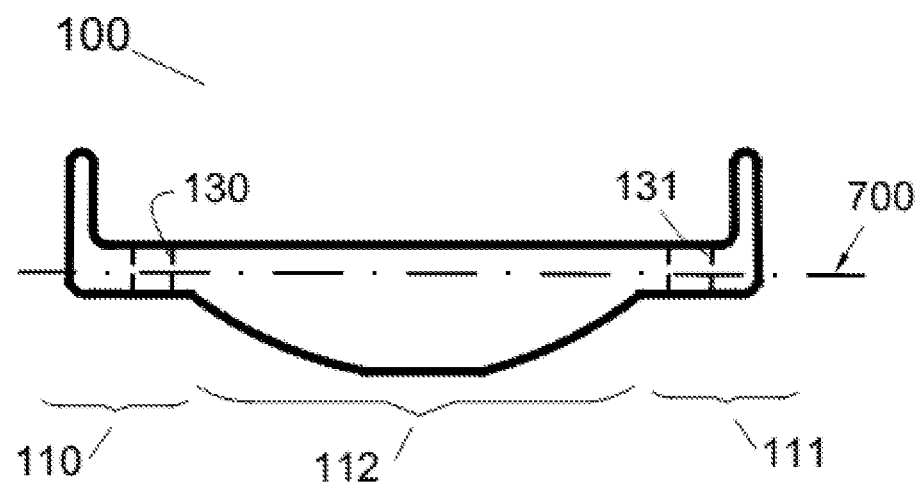
FIG. 16A is a drawing showing that the passageways of the first elastic end segment and second elastic end segment can be formed perpendicular to the longitudinal axis of the invention's one-piece body.
Figure 16B:
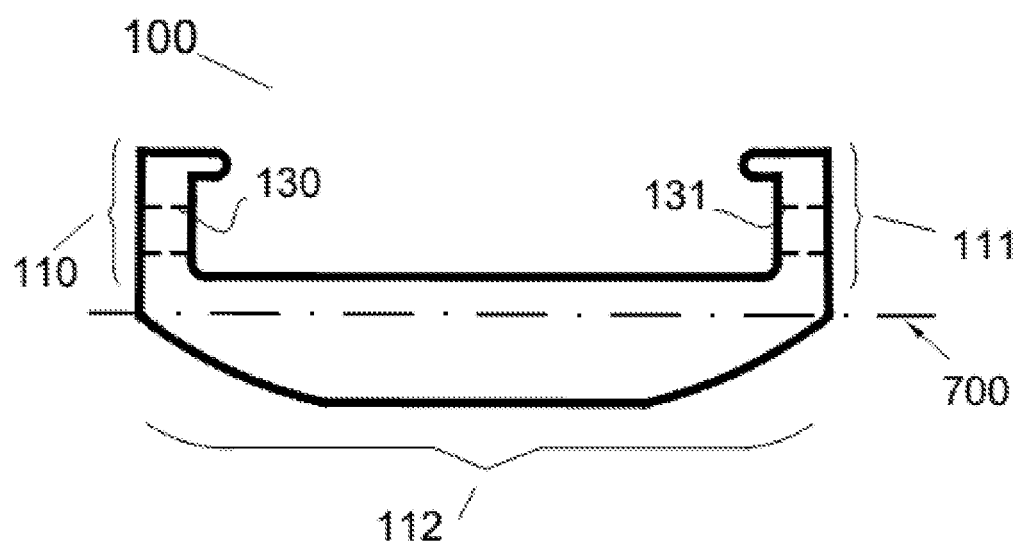
FIG. 16B is a drawing showing that the passageways of the first elastic end segment and second elastic end segment can be formed parallel to the longitudinal axis of the invention's one-piece body.

Preferred orientations of the formed passageways 130 and 131 (i.e., the orientation of the passageways when the parts were formed and prior to attaching the invention to the eyeglass temple arm) relative to the longitudinal axis of the invention's one-piece body 700 include perpendicular (FIG. 16A) and parallel (FIG. 16B). The first elastic end segment and second elastic end segment comprising passageways 130 and 131 that are formed perpendicular (e.g., when the invention is molded or 3D-printed) to the longitudinal axis of the invention's one-piece body 700 are then flexed so that the passageways are parallel to the longitudinal axis of the eyeglass temple arm to attach the invention to an eyeglass temple arm, which is facilitated by the elasticity of the first elastic end segment and second elastic end segment.

Passageways 130 and 131 that are formed in the invention segment ends 110 and 111, respectively, parallel to the longitudinal axis of the invention's one-piece body 700 (as shown in FIG. 16B) would not need to be flexed as much as perpendicularly-formed passageways (shown in FIG. 16A) to attach the invention to the eyeglass temple arm, since the passageways in FIG. 16B are already substantially parallel to the longitudinal axis of the eyeglass temple arm. However, passageways 130 and 131 that are formed perpendicular to the longitudinal length axis of the invention's one-piece body (and to the longitudinal length axis of the elastic middle segment) can provide improved manufacturability and reduced manufacturing cost of invention since removable pins may not be needed during the molding process. Removable pins and more complicated production tooling/procedures are likely needed in the molding process if the passageways 130 and 131 are formed parallel to the longitudinal length axis of the invention's one-piece body as is also the case for other eyeglass temple arm attachments of columnar or tubular designs.

In another embodiment of this invention, the two elastic end segments, 110 and 111, may further comprise graspable tabs. The graspable tabs 120 and 121 of the invention shown in FIG. 14A for invention embodiment 100, for example, may have any size, shape or geometry. Graspable tabs can provide the means for the wearer to more easily attach, detach, move and adjust the two elastic end segments 110 and 111 along the eyeglass temple arm. Further, the graspable tabs 120 and 121 may comprise a wettable surface having any texture, or may comprise at least one raised tactile structure (e.g., at least one rib) to provide varying degrees of graspability.

Figure 17A:
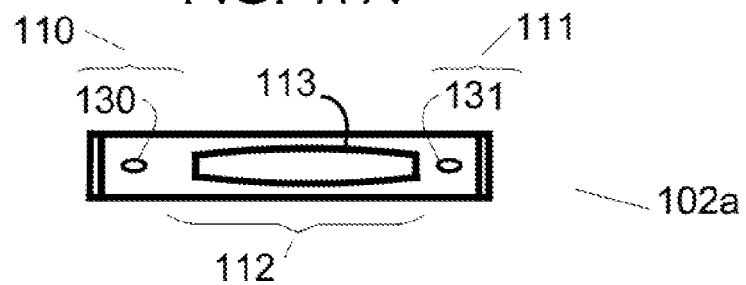
FIG. 17A, FIG. 17B, FIG. 17C, and FIG. 17D are top views of invention embodiments depicting that the elastic middle segment may comprise at least one open cavity having various geometries.
Figure 17B:
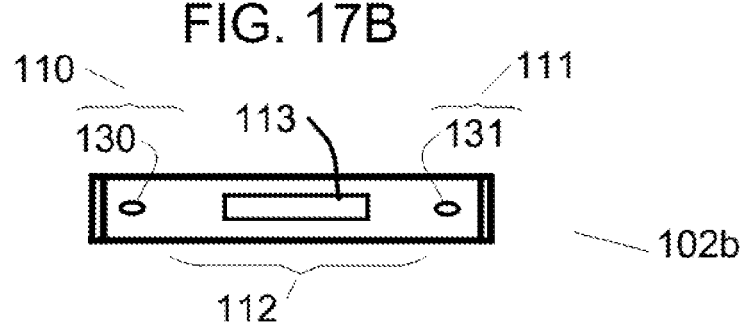
Figure 17C:
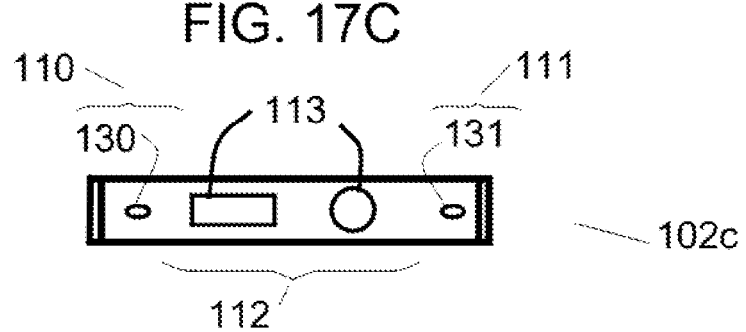
Figure 17D:
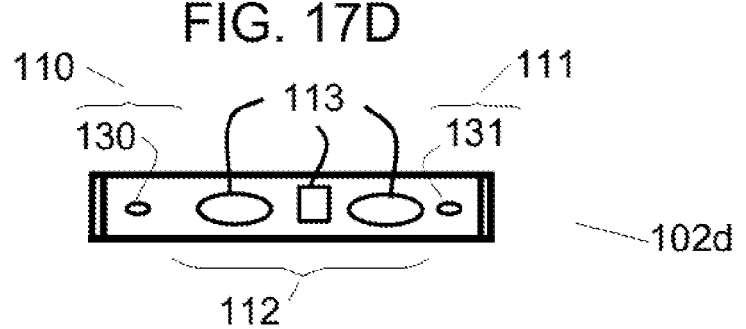

The elastic middle segment 112 of the invention may comprise at least one open cavity 113 (e.g., see FIG. 5C and FIG. 5D, invention embodiment 102). The at least one open cavity 113 can be any shape or geometry that can be accommodated by the size of the elastic middle segment 112 of the invention. The at least one open cavity 113 can be sized to receive and protectively hold at least one small device, at least one fashionwear article, or combinations thereof. The at least one open cavity 113 can also allow another invention's elastic middle segment to fit inside (i.e., "nest"), so that two inventions can overlap. FIG. 17A, FIG. 17B, FIG. 17C and FIG. 17D are top views of invention embodiments 102a, 102b, 102c, and 102d showing elastic middle segment 112 comprising various geometries and configurations of the at least one open cavity 113. FIG. 17A depicts a substantially elliptical top view shape for open cavity 113, FIG. 17B depicts a substantially rectangular top view shape for open cavity 113, FIG. 17C depicts two open cavities 113 having different geometries, and FIG. 17D depicts three open cavities 113 having different geometries. Various other configurations and geometries can be contemplated by those skilled in the art. The depth of the at least one open cavity 113 of elastic middle segment 112 may also vary along the longitudinal axis length of elastic middle segment 112.

It is further contemplated that the opening for the at least one open cavity 113 can be on any side of the elastic middle segment 112. For example, the opening for the at least one open cavity could be on the side of elastic middle segment proximal to the eyeglass temple arm, on the side of the elastic middle segment distal to the eyeglass temple arm, or on any other side or surface of the elastic middle segment.

It is also contemplated that the outer edges or surfaces of the invention that may contact the head, face or ear of the wearer can be rounded or contoured to provide comfort to the wearer.

The invention is intended for use with eyeglasses for prolonged periods of time without causing skin irritation. Accordingly, the material of construction used for the invention, at least the material of the invention that is contact with the wearer's skin, is preferably an elastomeric biocompatible polymer material. In this context, biocompatible refers to a material that comprises non-toxic and non-irritating properties and is incapable of producing allergic reactions to a significant degree under normal conditions of use.

The invention may also be used along with other eyeglass attachments designed for comfort and retention on the eyeglass wearer's head. In particular, the invention can be movably attached over such attachments to provide the added benefit of eyeglass straightening.

It is understood by those skilled in the art that a reference to elastic or elastomeric materials of construction include, but are not limited to, silicones, silicone co-polymers and thermoplastic elastomers (TPE). Various types of silicones such as room temperature vulcanized (RTV), high temperature vulcanized (HTV), liquid silicone rubbers, 1-part, 2-part, acetoxy cured, alkoxy cured, oxime cured, peroxide cured, moderate and high temperature cured, platinum-catalyzed cured, and tin-catalyzed cured are contemplated. Examples of thermoplastic elastomers contemplated for this invention include, but are not limited to, styrenic block copolymers, polyolefin elastomers, polyurethanes, copolyesters, and polyamides. The invention should be formable from the preferred elastomeric materials of construction using appropriate production processes including, but not limited to, molding, 3D-printing, cutting, and carving.

The preferred Shore hardness durometer of silicones used for this invention's material of construction, as measured per ASTM standard D2240 or equivalent, is between about 20 Type A and 40 Type A. The preferred elongation of silicones used for this invention's material of construction, as measured per ASTM standard D412 or equivalent, is greater than about 250%. The preferred tear strength of silicones used for this invention's material of construction, as measured per ASTM standard D624 or equivalent, is greater than about 75 pounds-force per inch (ppi).

It should be noted that the present invention is not limited only to the above-mentioned embodiments, and may be subjected to various modifications and alterations. For example, FIG. 4A depicts the elastic middle segment 112 of the invention as a single substantially rounded shape, but various shapes for elastic middle segment 112 are contemplated and are not limited to a single substantially rounded shape. Also, in each invention embodiment described above illustrating the invention attached to an eyeglass temple arm 30 (e.g., FIG. 3A), it is understood that the invention can also be applied to either (i.e., right or left) eyeglass temple arm.

Although this invention has been described in specific detail with reference to the enclosed detailed description and invention embodiments, it will be understood that many variants, modifications and combinations of the invention embodiments may be effected within the spirit and scope of the invention as described in the appended claims.

The invention claimed is:

1. An attachment for eyeglasses, the eyeglasses comprising an eyeglass temple arm, the attachment comprising:

a first elastic end segment comprising a first elastic end segment passageway configured to surround and movably grip said eyeglass temple arm;
a second elastic end segment comprising a second elastic end segment passageway configured to surround and movably grip said eyeglass temple arm; and
an elastic middle segment disposed between said first elastic end segment and said second elastic end segment; wherein:
said elastic middle segment and said attachment for eyeglasses have a longitudinal axis; said elastic middle segment longitudinal axis has an elastic middle segment longitudinal axis length; and said elastic middle segment comprises a variable thickness along said elastic middle segment longitudinal axis length;
and wherein:
the attachment for eyeglasses has a longitudinal axis between the first and second elastic end segments; and the first elastic end segment passageway and the second elastic end segment passageway are formed substantially perpendicular to the attachment for eyeglasses' longitudinal axis, in the native state of the attachment prior to attaching to the eyeglasses.

2. The attachment for eyeglasses of claim 1, wherein said elastic middle segment is non-enclosing to said eyeglass temple arm.

3. The attachment for eyeglasses of claim 1, in which said elastic middle segment comprises at least one open cavity.

4. The attachment for eyeglasses of claim 1, further comprising at least one graspable tab.

5. The attachment for eyeglasses of claim 1, in which said elastic middle segment comprises a layered structure.

6. The attachment for eyeglasses of claim 1, further comprising a texture on wettable surface of said attachment for eyeglasses.

7. The attachment for eyeglasses of claim 1, wherein said attachment for eyeglasses is constructed from a material selected from the group consisting of silicone, silicone co-polymers, thermoplastic elastomers, and elastomeric biocompatible polymers.

8. The attachment for eyeglasses of claim 7, in which said material further comprises at least one agent selected from the group consisting of strengthening, stiffening, anti-microbial, electrical shielding, electromagnetic shielding, and magnetic shielding.

9. The attachment for eyeglasses of claim 7, wherein the material selected from the group consisting of silicone, silicone co-polymers, thermoplastic elastomers, and elastomeric biocompatible polymers is silicone, and wherein said silicone has a Shore hardness durometer between about 20 Type A and about 40 Type A.

10. The attachment for eyeglasses of claim 9, wherein said silicone has an elongation greater than about 250%.

11. The attachment for eyeglasses of claim 1, wherein the elastic middle segment holds at least one fashionwear article selected from the group consisting of artwork, jewelry, stones, jewels, perfume diffusers, logos and trademarks.

12. The attachment for eyeglasses of claim 1, wherein the elastic middle segment holds at least one small device.

13. A method for holding articles, said method comprising:
providing an attachment for eyeglasses, the eyeglasses comprising an eyeglass temple arm, the attachment for eyeglasses comprising:
a first elastic end segment comprising a first elastic end segment passageway configured to surround and movably grip said eyeglass temple arm;
a second elastic end segment comprising a second elastic end segment passageway configured to surround and movably grip said eyeglass temple arm; and
an elastic middle segment disposed between said first elastic end segment and said second elastic end segment; wherein:
said elastic middle segment and said attachment for eyeglasses have a longitudinal axis; said elastic middle segment longitudinal axis has an elastic middle segment longitudinal axis length; and said elastic middle segment comprises a variable thickness along said elastic middle segment longitudinal axis length;
and wherein:
the attachment for eyeglasses has a longitudinal axis between the first and second elastic end segments; and the first elastic end segment passageway and the second elastic end segment passageway are formed substantially perpendicular to the attachment for eyeglasses' longitudinal axis, in the native state of the attachment prior to attaching to the eyeglasses;
placing at least one article selected from the group consisting of small devices and fashionwear on said elastic middle segment;
feeding the eyeglass temple arm through the first elastic end segment passageway; and
feeding the eyeglass temple arm through the second elastic end segment passageway.

14. The method of claim 13, wherein the elastic middle segment comprises at least one open cavity.

15. The method of claim 13, wherein the attachment for eyeglasses further comprises at least one graspable tab.

16. The method of claim 13, wherein the attachment for eyeglasses is constructed from a material selected from the group consisting of silicone, silicone co-polymers, thermoplastic elastomers, and elastomeric biocompatible polymers.

17. A method for manufacturing an attachment for eyeglasses, said attachment for eyeglasses comprising:
a first elastic end segment comprising a first elastic end segment passageway configured to surround and movably grip said eyeglass temple arm;
a second elastic end segment comprising a second elastic end segment passageway configured to surround and movably grip said eyeglass temple arm; and
an elastic middle segment disposed between said first elastic end segment and said second elastic end segment; wherein:
said elastic middle segment and said attachment for eyeglasses have a longitudinal axis; said elastic middle segment longitudinal axis has an elastic middle segment longitudinal axis length; and said elastic middle segment comprises a variable thickness along said elastic middle segment longitudinal axis length;
and wherein:
the attachment for eyeglasses has a longitudinal axis between the first and second elastic end segments; and the first elastic end segment passageway and the second elastic end segment passageway are formed substantially perpendicular to the attachment for eyeglasses' longitudinal axis, in the native state of the attachment prior to attaching to the eyeglasses;
said method comprising:
forming the first and second elastic end segment passageways in an orientation substantially perpendicular to the attachment for eyeglasses' longitudinal axis.

18. The method of claim 17, wherein said attachment for eyeglasses further comprises at least one graspable tab.

19. A method for straightening eyeglasses, said method comprising:

provinding an attachment for eyeglasses, said eyeglasses having a wearer, said wearer having an ear, the eyeglasses comprising an eyeglass temple arm, the attachment for eyeglasses comprising:

a one-piece body;

a first elastic end segment comprising a first elastic end segment passageway configured to surround and movably grip said eyeglass temple arm;

a second elastic end segment comprising a second elastic end segment passageway configured to surround and movably grip said eyeglass temple arm; and an elastic middle segment disposed between said first elastic end segment and said second elastic end segment; wherein:

said elastic middle segment and said one-piece body have a longitudinal axis;

said elastic middle segment longitudinal axis has an elastic middle segment longitudinal axis length;

said elastic middle segment comprises a variable thickness along said elastic middle segment longitudinal axis length;

and further wherein:

said first elastic end segment passageway and said second elastic end segment passageway are configured to securely hold said one-piece attachment at various positions along said eyeglass temple arm;

said various positions are selected from the group consisting of: a) displacement positions wherein said elastic middle segment is not contiguous with said eyeglass temple arm, and b) a nominal position wherein said elastic middle segment is contiguous with said eyeglass temple arm;

feeding the eyeglass temple arm through the first elastic end segment passageway;

feeding the eyeglass temple arm through the second elastic end segment passageway; and positioning the eyeglass attachment between the wearer's ear and the eyeglass temple arm.

20. The method of claim 19, wherein said attachment for eyeglasses is constructed from a material selected from the group consisting of silicone, silicone co-polymers, thermoplastic elastomers, and elastomeric biocompatible polymers.

21. The method of claim 19, wherein said attachment for eyeglasses further comprises at least one graspable tab.

* * * * *